United States Patent
Yamato et al.

Patent Number: 5,944,792
Date of Patent: Aug. 31, 1999

[54] DATA TRANSFER DEVICE WITH COMPUTED START TIMES FOR DATA BLOCKS

[75] Inventors: Jun-ichi Yamato; Hisayuki Aoki, both of Tokyo, Japan

[73] Assignee: NEC Corporation, Tokyo, Japan

[21] Appl. No.: 08/780,219

[22] Filed: Jan. 8, 1997

[30] Foreign Application Priority Data

Jan. 12, 1996 [JP] Japan .................................. 8-003717

[51] Int. Cl.$^6$ .................................................. G06F 13/00
[52] U.S. Cl. ........................................................... 709/219
[58] Field of Search ...................... 364/DIG. 1 MS File, 364/DIG. 2 MS File; 395/200.49, 200.56, 200.59, 200.61, 200.79; 370/401, 431; 348/7, 552; 455/4.2; 709/219, 226, 231, 249

[56] References Cited

U.S. PATENT DOCUMENTS

| | | | |
|---|---|---|---|
| 5,608,540 | 3/1997 | Ogawa | 358/434 |
| 5,610,841 | 3/1997 | Tanaka et al. | 364/514 |
| 5,787,482 | 7/1998 | Chen et al. | 711/158 |

FOREIGN PATENT DOCUMENTS

| | | |
|---|---|---|
| 2-056626 | 2/1990 | Japan . |
| 3-183067 | 8/1991 | Japan . |
| 4-264947 | 9/1992 | Japan . |
| 4-266263 | 9/1992 | Japan . |
| 5-27911 | 2/1993 | Japan . |
| 5-257614 | 10/1993 | Japan . |
| 5-265661 | 10/1993 | Japan . |
| 6-28110 | 2/1994 | Japan . |
| 7-274107 | 10/1995 | Japan . |
| 8-504283 | 5/1996 | Japan . |
| 9-106327 | 4/1997 | Japan . |

OTHER PUBLICATIONS

E. T. Kalns et al., "Video on Demand Using the Vesta Parallel File System", pp. 1–16.

"Video Server Coping with Moving Picture through Expansion of NSF and TCP/IP", Nikkei Electronics, No. 645, pp. 133–141, (1995).

*Primary Examiner*—Robert B Harrell
*Attorney, Agent, or Firm*—Foley & Lardner

[57] ABSTRACT

A data reading device for accepting an external data transfer request, reading desired data from a storage device which stores various data and transferring the data to a sender of the data transfer request, which includes a client for issuing a reading request which designates data corresponding to a data transfer request and a time of a reading deadline of the data, a reading request sorting unit for accepting and storing an issued reading request and fetching them in descending order of reading deadlines, and a file reading unit for reading data corresponding to a reading request fetched by the reading request sorting unit from the data storage device.

11 Claims, 12 Drawing Sheets

DATA TRANSFER DEVICE WITH COMPUTED START TIMES FOR DATA BLOCKS

BACKGROUND OF THE INVENTION

1. Field of the Invention

The present invention relates to a data reading device for reading data stored in a data storage device such as a magnetic disk device or an optical disk device and, more particularly, to a data reading device for reading such data as a video file with constraints on the time from the reception of a data transfer request until the data transfer to a requester.

2. Description of the Related Art

Systems for reading and sending accumulated data at a request from a plurality of users, such as a video server, need to respond to data transfer requests from as many users as possible concurrently. In addition, such a system is required to start sending data in response to a data transfer request and to send the data to the end of a file without intermission.

Commonly used as a video file storage device is a disk device whose storage medium is a magnetic disk or an optical disk. Magnetic disk devices read data written at an arbitrary place on a disk by moving a magnetic head to the place where target data is stored. Disk devices thus require movement of a head for reading data and need a certain time accordingly. Moreover, since a head moving distance differs depending on a storage position of data to be read, it is difficult to estimate a time required for reading data.

In a case where only one file is read in response to one data transfer request instead of responding to a plurality of data transfer requests concurrently, data reading requests to a disk device can be issued in consideration of the time for reading data from the disk device so that data transfer does not terminate halfway. In other words, by predicting a time required for reading each data in a file based on a reading order of each data and a storage position of the data on the disk, appropriate number of data reading requests are issued to the disk device in advance such that subsequent data reading is finished until data transfer interrupts. This prevents data transfer from terminating halfway.

In responding to a plurality of data transfer requests concurrently, however, a reading request can not be issued to a disk device in advance for reading one file. Various means have been therefore proposed for transferring data without intermission to the end of a file.

In the following description, a time required for the data to be read from a disk device, that is, a time at which data transfer interrupts unless reading of the data is finished by that time, is referred to as a deadline time. A time period from a certain time point until a deadline time is referred to as a deadline margin time. A device which issues a data reading request to a data reading device upon receiving a transfer request from a user is referred to as a client. In a video server system which provides the video on demand service, the equivalent of a client is a unit which has the function of accepting commands from a user, issuing reading request corresponding to the commands to a data reading device, converting data read from the data reading device into video data and transferring the data to the user.

In a data reading device of this kind, a maximum data amount (hereinafter referred to as allowable amount) whose reading can be completed within a fixed time period can be computed in advance based on the amount of data (throughput) which is readable from a disk device per unit time. Conventional data reading devices therefore limit the number of clients in advance to prevent the amount of data to be read from exceeding the allowable amount of data of a disk device even when reading requests from a plurality of clients avalanche. This ensures that subsequent data is read from the disk device by a deadline time and enables concurrent data reading in response to reading requests from all the clients.

In addition, the number of clients can be increased by improving a throughput of a disk device. Other conventional data reading devices therefore improve a disk device throughput by providing a cache memory.

Another conventional data reading device is disclosed in Japanese Patent Laying-Open (Kokai) No. Heisei 5-257614. Recited in the literature is a data reading device in which improved throughput is achieved by appropriately changing the order of data reading from a disk device such that the amount of movement of a magnetic head is reduced, thereby shortening a reading time.

In addition, the possibility of data interruption can be reduced by increasing a deadline margin time. In other conventional data reading devices, therefore, a buffer memory is provided at a client and a reading request to a disk device is issued as early as possible to prevent the buffer memory from getting empty.

Any of the above-described conventional data reading devices read data in the order in which a disk device accepts reading requests from clients. In responding to the reading requests from a plurality of clients, however, since deadline margin time varies with each client, it is efficient to give priority to data reading whose reading request has a shorter deadline margin time.

One of conventional data reading devices of this kind is disclosed in Japanese Patent Laying-Open (Kokai) No. Heisei 4-264947. The literature discloses a technique for scheduling the order of data reading according to the priority given to a client. According to the technique, when a client with a shorter deadline margin time and a client with a longer deadline margin time exist together, higher priority is given to the client with a shorter deadline margin time over the client with a longer deadline margin time. Then, data is read from a disk device in the order of the priority according to a deadline margin time. This enables data reading for a higher-priority client with a shorter deadline margin time to be given the priority for reading even when a reading request from a higher-priority client is issued later than a reading request from other lower-priority clients. As a result, a client with a shorter deadline margin time is more unlikely to fail to keep a deadline time.

Image data of moving picture as a processing object in a video server system is ordinarily encoded according to various kinds of encoding formats because the data is of large size. The amount of encoded image data equivalent to image per unit time varies with an encoding format and a data transfer rate varies accordingly. Therefore, in case of dealing with image data of a plurality of kinds of encoding formats in one video server system, multiple transfer rates differing with encoding formats must be achieved simultaneously.

One of conventional techniques of this kind is, for example, a data reading device (video server) disclosed in the article "Video Server Coping with Moving Picture through Expansion of NSF and TCP/IP" (Nikkei Electronics No. 645, pp. 133–141). The article recites a data reading device including queues provided at each client for buffering a reading request to a disk device. This device has queues correspond to transfer rates of data of reading requests stored in the queues. Then, the device achieves various kinds of transfer rates by scheduling the order of choosing a queue to take a reading request from, according to transfer rates.

On the other hand, some moving picture compressing encoding exploits a difference between adjacent images. Such encoding is characterized by high compression rate of image data. However, the amounts of encoded data varies with the contents of image even if the amounts of corresponding original image data are the same. In other words, a transfer rate of encoded data varies depending on data positions even in one video file.

As described in the foregoing, conventional data reading devices, when reading data from a disk device at the request of one client, can avoid interruption of data transfer halfway by predicting a time required for data reading and issuing appropriate number of reading requests to the disk device in advance. In processing reading requests from a plurality of clients concurrently, however, the order of reading requests sent to the disk device is affected by the timing at which data transfer requests arrive at the data reading device or files to be accessed by clients. It is therefore difficult to predict a time required for reading data and accordingly impossible to avoid data transfer interruption by simply issuing reading requests to the disk device in advance.

In addition, conventional data reading devices which avoid data transfer interruption by limiting the number of clients need to reduce the number of clients in consideration of some margin in order to keep a deadline time because the time required for reading data from a disk device is indefinite. The reasons why the time is indefinite are, for example, frequency of data reading requests and a deadline margin time varying with clients, a data reading throughput changing with the amount of movement of a magnetic head and interaction among data reading requests from many clients. Because a data reading time is thus indefinite, the number of clients should be estimated to be small in order to reliably keep a deadline time, which prevents a disk device from being utilized at its full performance.

The conventional data reading devices having cache memories are intended for increasing the number of clients by improving a throughput utilizing localization of data access. Localization of data access, however, can not be expected in such a system dealing with image data of moving picture as a video server due to enormous data size. Cache memories are, therefore, inefficient for video server systems because, the number of clients can not be increased by much.

Increasing a throughput by changing the order of reading data as is implemented by the conventional data reading device disclosed in Japanese Patent Laying-Open (Kokai) No. Heisei 5-257614, has a drawback that a client whose order of data reading is moved down might fail to keep a deadline time.

The conventional data reading devices providing each client with a buffer memory are allowed to have a deadline margin time longer accordingly, thereby reducing the possibility of interruption of data transfer. However, since the disk devices read data in the order of acceptance of reading requests, existence of a client with a long deadline margin time and a client with a short deadline margin time together increases the possibility of data transfer interruption at the client with a short deadline margin. More specifically, when a reading request of the client with a long deadline margin time is accepted prior to that of the client with a short deadline margin time, data reading in response to the reading request accepted later from the client with a short deadline margin time is held over. As a result, clients with a short deadline margin time are more likely to fail to keep a deadline time.

The conventional data reading devices using queues with difference data transmission rates each of which provided at each client are only allowed to provide a single transfer rate for each client. It is, therefore, impossible to cope with a data transmission rate varying with positions in one video file in the system using compressing data encoding based on a difference between adjacent images.

SUMMARY OF THE INVENTION

An object of the present invention is to provide a data reading device capable of responding to reading requests from as many clients as possible in parallel while keeping a data reading deadline.

Another object of the present invention is to provide a data reading device capable of dealing with files with different transfer rates simultaneously.

A further object of the present invention is to provide a data reading device capable of flexibly coping with a case where a required transfer rate varies with place in the same file and a case where a client designates a data transfer rate.

According to one aspect of the invention, a data reading device for receiving an external data transfer request, reading desired data from data storing means which stores various data and transferring the data to a sender of said data transfer request, comprises reading request issuing means for issuing a reading request which designates data corresponding to said data transfer request and time of a reading deadline of the data;

reading request sorting means for accepting and storing said reading request issued by said reading request issuing means to fetch said reading request in descending order of said reading deadlines; and data reading means for reading data corresponding to said reading request fetched by said reading request sorting means from said data storing means.

In the preferred construction, the reading request issuing means is provided in plural corresponding to the number of senders of said data transfer request, and the reading request sorting means accepts said reading request issued from said plurality of reading request issuing means and fetches said reading request only according to the order of said reading deadlines whichever said reading request issuing means issues the reading request.

In the preferred embodiment, the reading request sorting means comprises reading request storing means for storing said reading request, and reading request inserting means for accepting said reading request and comparing a reading deadline attached to the accepted reading request and a reading deadline attached to a reading request stored in said reading request storing means to insert said accepted reading request such that all the reading requests are in descending order of reading deadlines from the output side of said reading request storing means.

In another preferred embodiment, the reading request sorting means comprises reading request storing means for storing said reading request, and reading request determining means for comparing reading deadlines attached to all the reading requests stored in said reading request storing means to determine a reading request with the earliest reading deadline as a first reading request to be fetched.

According to another aspect of the invention, a data reading device for accepting an external data transfer request, reading desired data from data storing means which stores various data and transferring the data to a sender of said data transfer request, comprises reading request issuing means for issuing a reading request which designates a data file corresponding to said data transfer request;

reading request managing means for accepting said reading request to divide an object data file into data blocks of predetermined size and designating a time of a reading deadline for each data block to generate a reading request of each data block;

transmission time computing means for computing a transfer starting time for each said data block which is used as a time of a reading deadline for each said data block;

reading request sorting means for accepting and storing a reading request of each said data block generated by said reading request managing means to fetch the requests in descending order of said reading deadlines;

data reading means for reading data corresponding to a reading request of each said data block fetched by said reading request sorting means from said data storing means;

data holding means for temporarily holding data read by said data reading means; and data transferring means for detecting said data block whose transfer is to be started based on a transfer starting time of each said data block computed by said transmission time computing means and fetching said detected data block from said data holding means to transfer said data block to a sender of said data transfer request.

In the preferred embodiment, the reading request issuing means and said reading request managing means are provided in plural corresponding to the number of senders of said data transfer request, and the reading request sorting means accepts said reading request of each said block issued from said plurality of reading request managing means and fetches said reading request only according to the order of said reading deadlines whichever said reading request managing means issues the reading request.

In the preferred embodiment, the reading request sorting means comprises reading request storing means for storing a reading request of each said data block, and reading request inserting means for accepting a reading request of each said data block and comparing a reading deadline attached to the accepted reading request and a reading deadline attached to a reading request stored in said reading request storing means to insert said accepted reading request such that all the reading requests line in descending order of reading deadlines from the output side of said reading request storing means.

In another preferred embodiment, the reading request sorting means comprises reading request storing means for storing a reading request of each said data block, and reading request determining means for comparing reading deadlines attached to all the reading requests stored in said reading request storing means to determine a reading request with the earliest reading deadline as a first reading request to be fetched.

In the above-mentioned embodiment, the reading request issuing means designates a read starting time for starting reading of a data file as an object of said reading request and attaches the designated time to said reading request, and the transmission time computing means computes a transfer starting time of data corresponding to a reading request of each said data block based on a read starting time attached to said reading request.

In the above-mentioned embodiment, the data reading device further comprises transfer rate registering means for registering a transfer rate of a data file stored in said data storing means, wherein the transmission time computing means computes a transfer starting time of data corresponding to the reading request of each said data block based on a transfer rate of a data file including data corresponding to said reading request of each said data block registered in said transfer rate registering means, and the data transferring means transfers data fetched from said data holding means at a transfer rate of the data registered in said transfer rate registering means.

In the above-mentioned embodiment, the data reading device further comprises data transfer rate registering means for registering a transfer rate of a data file stored in said data storing means on a basis of a data block of predetermined size formed by dividing a data file as an object of said reading request by said reading request managing means, wherein the transmission time computing means computes a transfer starting time of data corresponding to said reading request of each said data block based on a transfer rate of data corresponding to said reading request of each said data block registered in said data transfer rate registering means, and the data transferring means transfers data fetched from said data holding means at a transfer rate of the data registered in said transfer rate registering means.

In another preferred embodiment, the reading request issuing means designates a transfer rate of a data file as an object of said reading request and attaches the transfer rate to said reading request, the transmission time computing means computes a transfer starting time of data corresponding to a reading request of each said data block based on a transfer rate attached to said reading request, and the data transferring means transfers data fetched from said data holding means at a transfer rate attached to said reading request.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
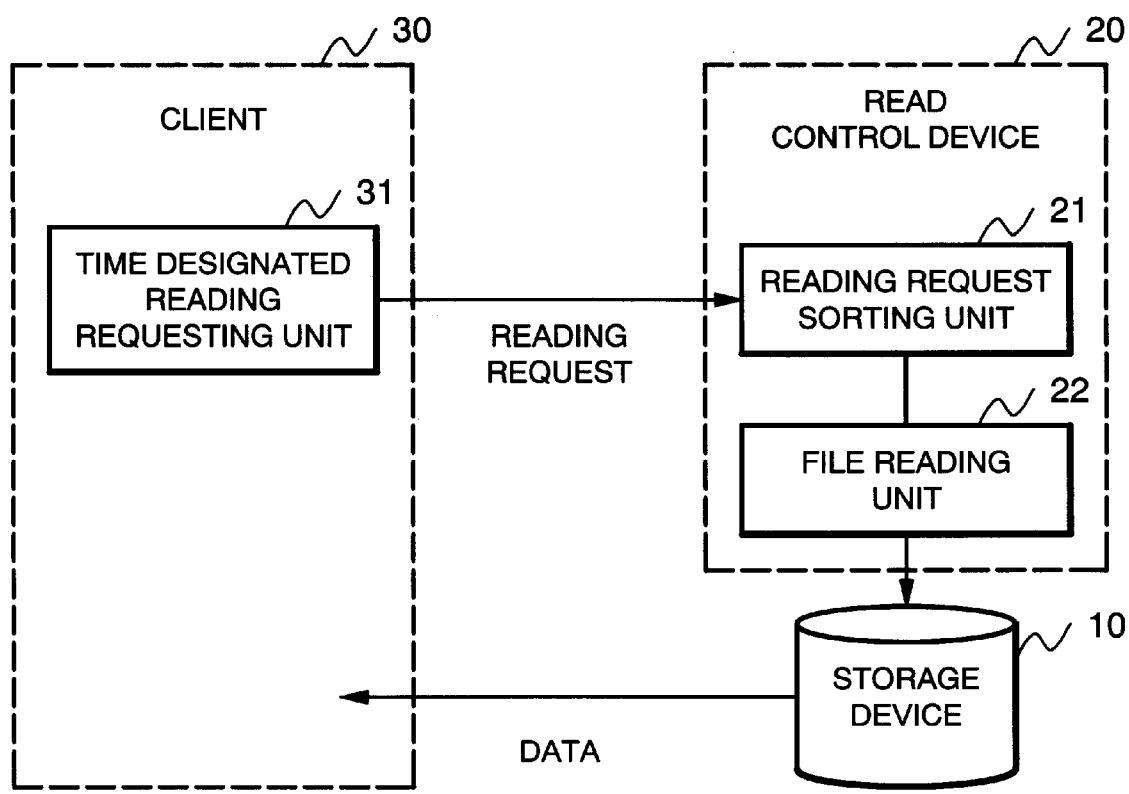
FIG. 1 is a block diagram showing structure of a data reading device according to a first embodiment of the present invention.

FIG. 1 is a block diagram showing structure of a data reading device according to a first embodiment of the present invention.

As illustrated in the figure, the data reading device of the present embodiment includes a storage device 10 for accumulating data files, a read control device 20 for issuing reading instructions to the storage device 10, and a client 30 for sending a file reading request to the read control device 20. In FIG. 1, illustration is made only of a characteristic part of the structure of the present embodiment and that of the remaining common part is not made. Although only one client 30 is illustrated for convenience, the read control device 20 is capable of accepting reading requests from a plurality of clients 30.

The storage device 10, which is implemented, for example, by a disk device having a magnetic disk or an optical disk as a storage medium, stores a data file which is a processing object of the present embodiment and is comprised of image data of moving picture and other various data. The storage device 10 accepts a read instruction from the read control device 20, reads data corresponding to the read instruction and sends the data to the client, while sending a completion notification indicative of the completion of data reading to the read control device 20 after sending the data.

The client 30 includes a time designated reading requesting unit 31 for generating a reading request to be sent to the read control device 20. Upon receiving a data transfer request of a user not shown, the time designated reading requesting unit 31 generates a request for reading a file corresponding to the transfer request. When in sending a reading request generated by the time designated reading requesting unit 31, the client 30 sets a deadline time which is a time limit for reading data of a file in question and sends the reading request with the set deadline time information attached thereto to the read control device 20. The client 30 is implemented by, for example, a program-controlled CPU and a predetermined interface which accepts a request of a user.

The read control device 20 includes a reading request sorting unit 21 for sorting and storing a reading request sent from a client in the order determined according to a deadline time for reading, and a file reading unit 22 for sequentially fetching a reading request from the reading request sorting unit 21 to issue a data reading instruction to the storage device 10. Description of the reading request sorting unit 21 will follow later. The file reading unit 22 is implemented by a CPU (central processing unit) including, for example, an ROM (read only memory) for storing a program and fixed data and an RAM (random access memory) for temporarily storing data necessary for executing a program. Data read from the storage device 10 is transferred to the client 30 as a sender of the reading request.

Figure 2:
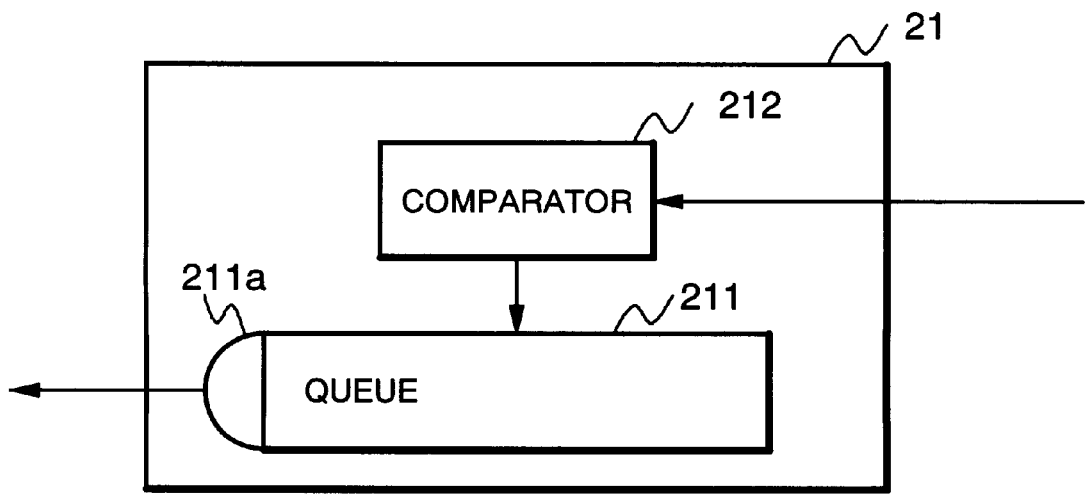
FIG. 2 is a block diagram showing an example of structure of a reading request sorting unit.

FIG. 2 is a block diagram showing an example of structure of the reading request sorting unit 21. As illustrated in the figure, the reading request sorting unit 21 includes a queue 211 and a comparator 212. The queue 211 stores a reading request from the client 30. The comparator 212 accepts a reading request from the client 30, compares a deadline time attached to the reading request in question and a deadline time attached to a reading request already stored in the queue 211, determines an insertion position of the reading request received from the client and inserts the request in the determined position. The comparator 212 here determines a reading request insertion position such that a reading request with early deadline time is stored on the side of an output terminal 211a of the queue 211.

Figure 3:
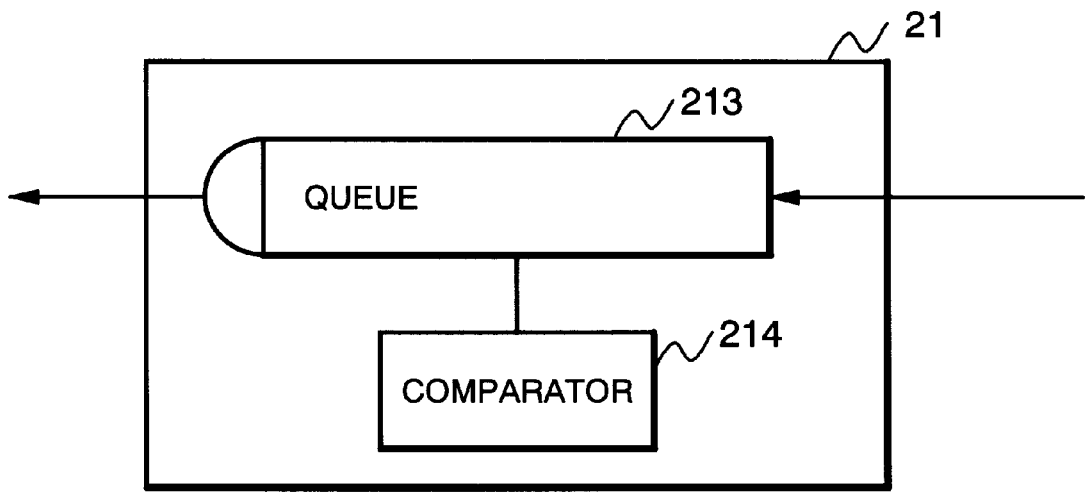
FIG. 3 is a block diagram showing another example of structure of a reading request sorting unit.

FIG. 3 is a block diagram showing another example of structure of the reading request sorting unit 21. As illustrated in the figure, the reading request sorting unit 21 includes a queue 213 and a comparator 214. The queue 213 stores reading requests from the client 30 in the order of acceptance. The comparator 214 determines a reading request to be fetched from the queue 213 based on a deadline time attached to a reading request. A reading request sent from the client 30 is stored at the rear of the queue 213. In taking a reading request out of the queue 213, the comparator 214 compares deadline times of all the reading requests stored in the queue 213 to select a reading request with the earliest deadline time and notifies the queue 213 of the selected request. The reading request notified by the comparator 214 is taken out of the queue 213 as a result.

Figure 4:
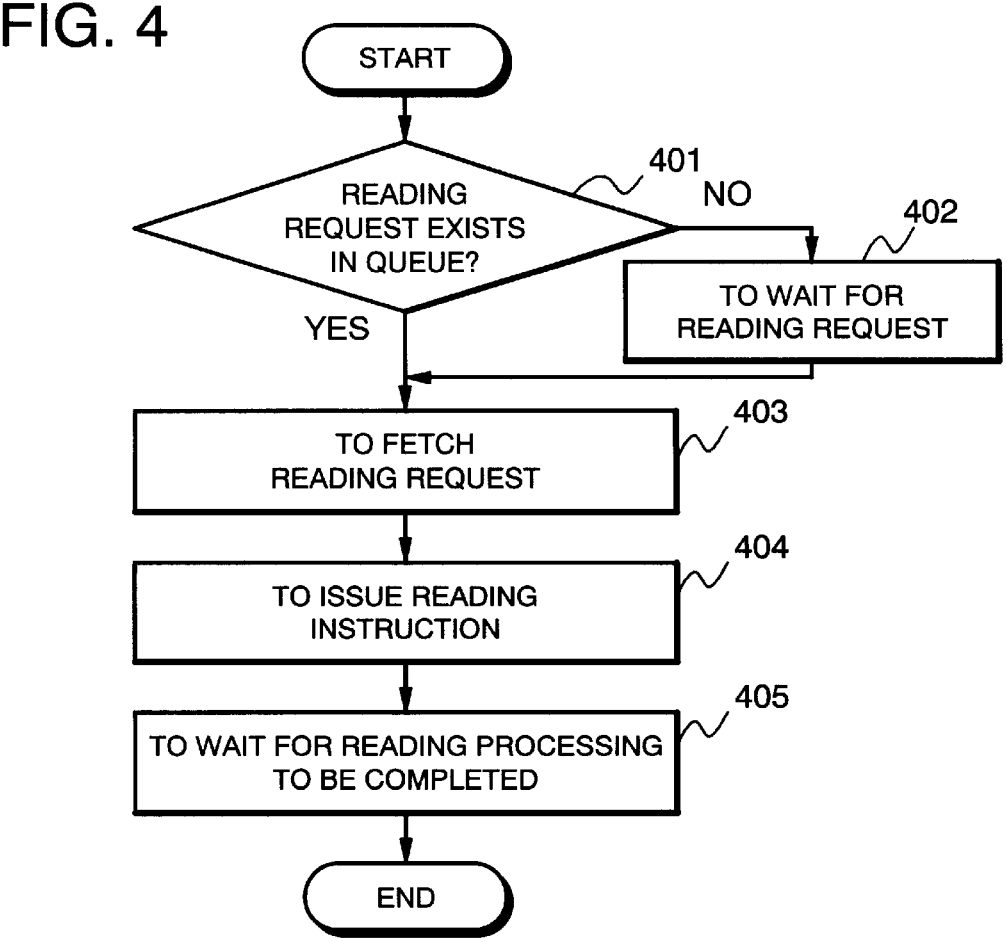
FIG. 4 is a flow chart showing operation of a file reading unit.

FIG. 4 is a flow chart showing operation of reading instruction issuing processing conducted by the file reading unit 22. Although in the following, description will be given assuming that the reading request sorting unit 21 is structured as shown in FIG. 2, there will be no fundamental difference even when the reading request sorting unit 21 is structured as shown in FIG. 3.

With reference to FIG. 4, the file reading unit 22 first checks whether a reading request is stored in the queue 211 included in the reading request sorting unit 21 (Step 401). When no reading request is stored, the following process waits until a reading request is stored in the queue 211 (Step 402). When reading requests exist in the queue 211, one reading request with the earliest deadline time is taken out (Step 403) and then a reading instruction corresponding to the read reading request is issued to the storage device 10 (Step 404). After the issuance of the reading instruction, the file reading unit 22 waits for a completion notification indicative of the completion of data reading corresponding to the reading instruction in question to be sent from the storage device 10 (Step 405). Upon receiving the completion notification from the storage device 10, processing is finished.

Figure 5:
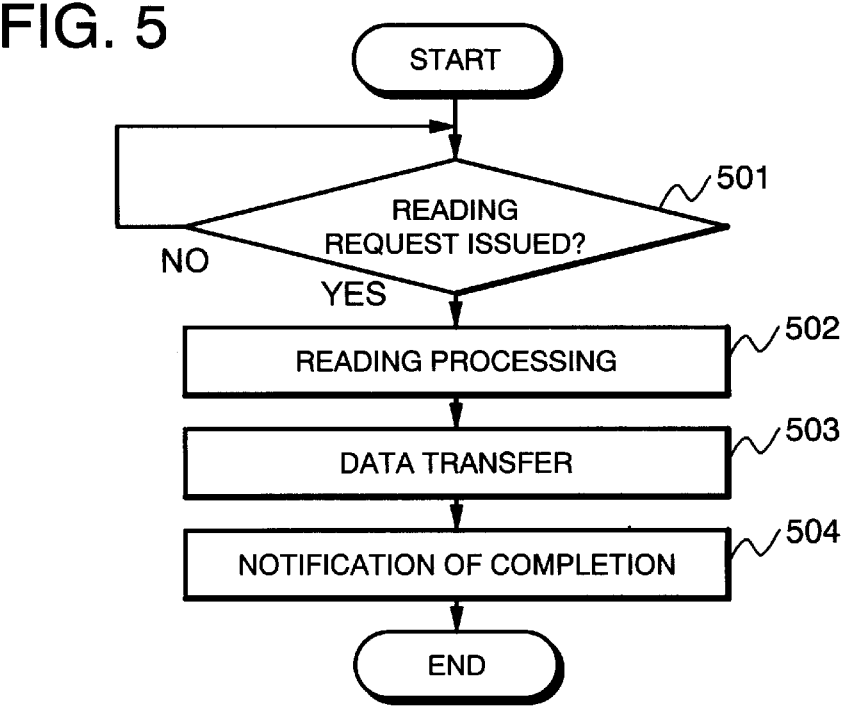
FIG. 5 is a flow chart showing operation of a storage device.

FIG. 5 is a flow chart showing operation of file reading processing conducted by the storage device 10.

With reference to FIG. 5, upon the issuance of a reading instruction from the file reading unit 22, the storage device 10 reads data corresponding to the reading instruction in question (Steps 501, 502). Upon completion of the data reading, the storage device 10 transfers the read data to the client 30 (Step 503). Thereafter, the storage device issues a completion notification to the file reading unit 22 (Step 504) to complete processing. While in FIG. 5, a completion notification is issued after the transfer of read data, the notification may be issued simultaneously with the data transfer.

According to the present embodiment, as described in the foregoing, a reading request with a deadline time attached thereto sent from each client 30 is temporarily accumulated in a queue and is taken therefrom to conduct data reading in descending order of deadline times. This enables reading of data in descending order of deadline margin times even at the time of accepting reading requests from a plurality of clients 30 in parallel.

Even in a case, for example, where a large number of reading requests are simultaneously issued from a plurality of clients 30 to the read control device 20, reading requests having enough time before the time limit for reading are held over and reading requests not having enough time are given priority for processing. The reading requests held over receive higher priority when they have less time margin as the time limit of a reading request draws near. As a result, data is read in the order of priority according to a time margin of a reading time limit for each reading request, thereby reducing the cases where a file transmission is not completed by the deadline time.

Moreover, since the order of priority is determined according to a reading time limit of each reading request in the present embodiment, appropriate priority order is given to each reading request whichever client 30 issues the reading request, thereby flexibly coping with practical use.

Figure 6:
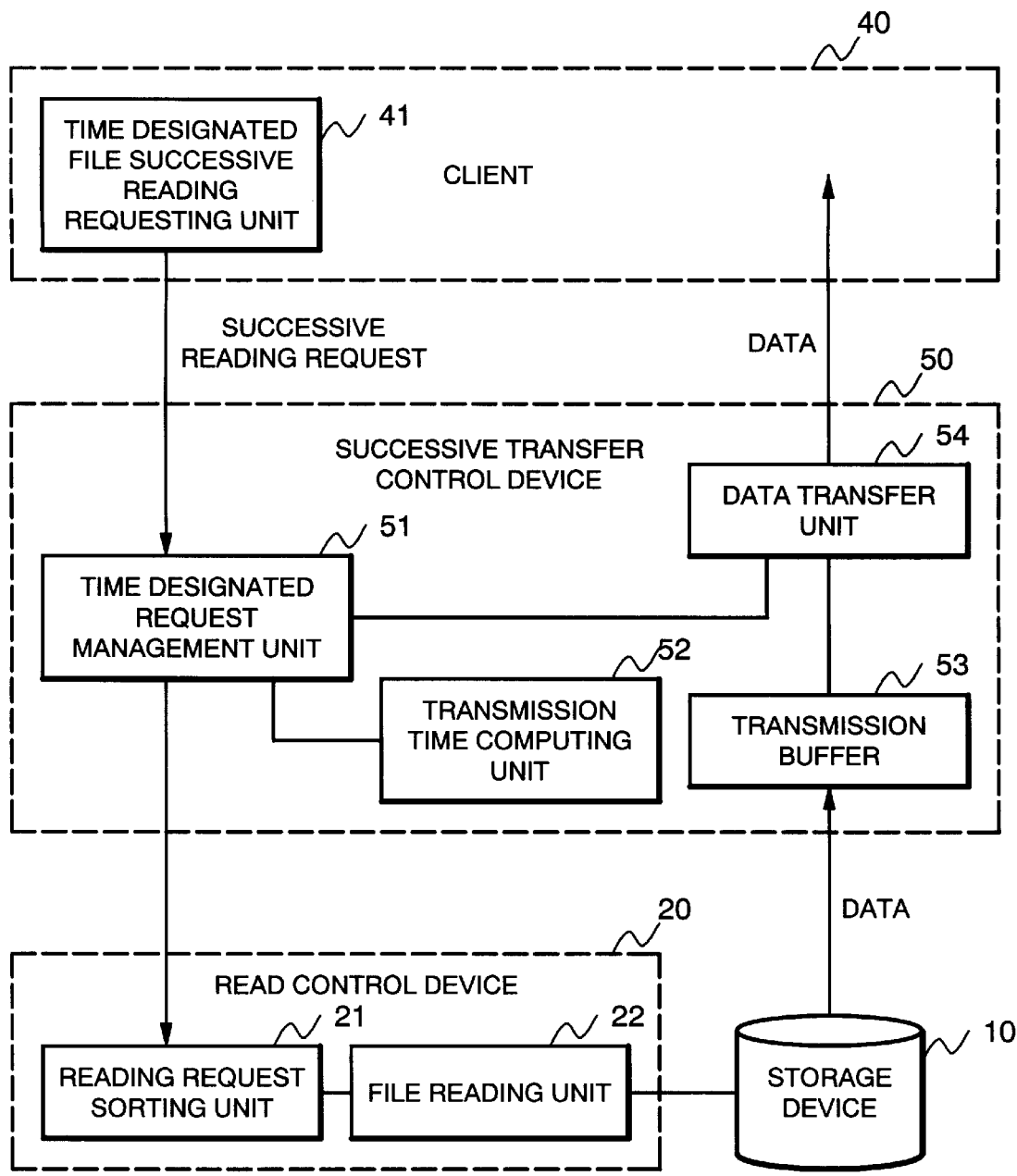
FIG. 6 is a block diagram showing structure of a data reading device according to a second embodiment of the present invention.

FIG. 6 is a block diagram showing structure of a data reading device according to a second embodiment of the present invention.

The second embodiment is applicable to successive reading of one file like video reproduction. To implement this processing by the present embodiment, one file is divided into a plurality of blocks and data is read from a storage device on a block basis. In addition, data read from the storage device is temporarily held in a transmission buffer until it is transferred to a client. Then, a deadline time necessary for successively transmitting files to the client is obtained for each block, data in each block is read onto the transmission buffer in descending order of deadline times, and at a deadline time, data of a block corresponding to the deadline time is transferred to the data requesting client from the transmission buffer.

The present embodiment also makes it possible, from when one block is read until when the subsequent block in the same file is read, to read a block in another file with an earlier deadline time by dividing one file into a plurality of blocks and reading data from them. This enables parallel reading of a plurality of files to simultaneously respond to reading requests from a plurality of clients. Furthermore, since data is read in the priority order of the deadline times, even if one file is read as a plurality of blocks, data in the file can be successively transferred to a client.

The data reading device provided with the above-described functions according to the second embodiment includes, as shown in FIG. 6, a storage device 10 for accumulating data files, a read control device 20 for issuing reading instructions to the storage device 10, a client 40 as a sender of a file reading request, and a successive transfer control device 50 for dividing reading requests into reading requests on a block basis. In the above-described structure, the storage device 10 and the read control device 20 are structured similarly to those of the first embodiment shown in FIG. 1 and the same reference numerals are allotted thereto to omit their description. In FIG. 6, illustration is made only of a characteristic part of the structure of the present embodiment and that of the remaining common part is not made.

The client 40 includes a time designated file successive reading requesting unit 41 for generating a reading request and attaching read time information indicative of a starting time of the transfer of the first data of a file as a read object to the generated reading request. The reading request instructs to start successively transferring a plurality of blocks included in a file at a designated read time. In the following description, a reading request issued by the time designated file successive reading requesting unit 41 is referred to as a successive reading request.

The successive transfer control device 50 includes a time designated request management unit 51 for receiving successive reading requests from the client 40 and dividing them into reading requests on a block basis, a transmission time computing unit 52 for obtaining a time for starting data transfer with respect to each block, a transmission buffer 53 for temporarily holding data read from the storage device 10, and a data transfer unit 54 for transferring data stored in the transmission buffer 53 at a designated time.

The time designated request management unit 51 notifies the data transfer unit 54 of a read time attached to a successive reading request received from the client 40. In addition, the unit 51 issues a reading request of each block, with a transmission starting time of each block obtained at the transmission time computing unit 52 as a deadline time. The data transfer unit 54 has a clock provided therein and at a time notified of by the time designated request management unit 51, fetches data of a relevant block from the transmission buffer 53 and transfers the same to the client 40. The time designated request management unit 51, the transmission time computing unit 52 and the data transfer unit 54 are implemented, for example, by a CPU having an ROM and an RAM provided therein.

The read control device 20 includes, similarly to the read control device 20 of the first embodiment shown in FIG. 1, a reading request sorting unit 21 and a file reading unit 22.

Figure 7:
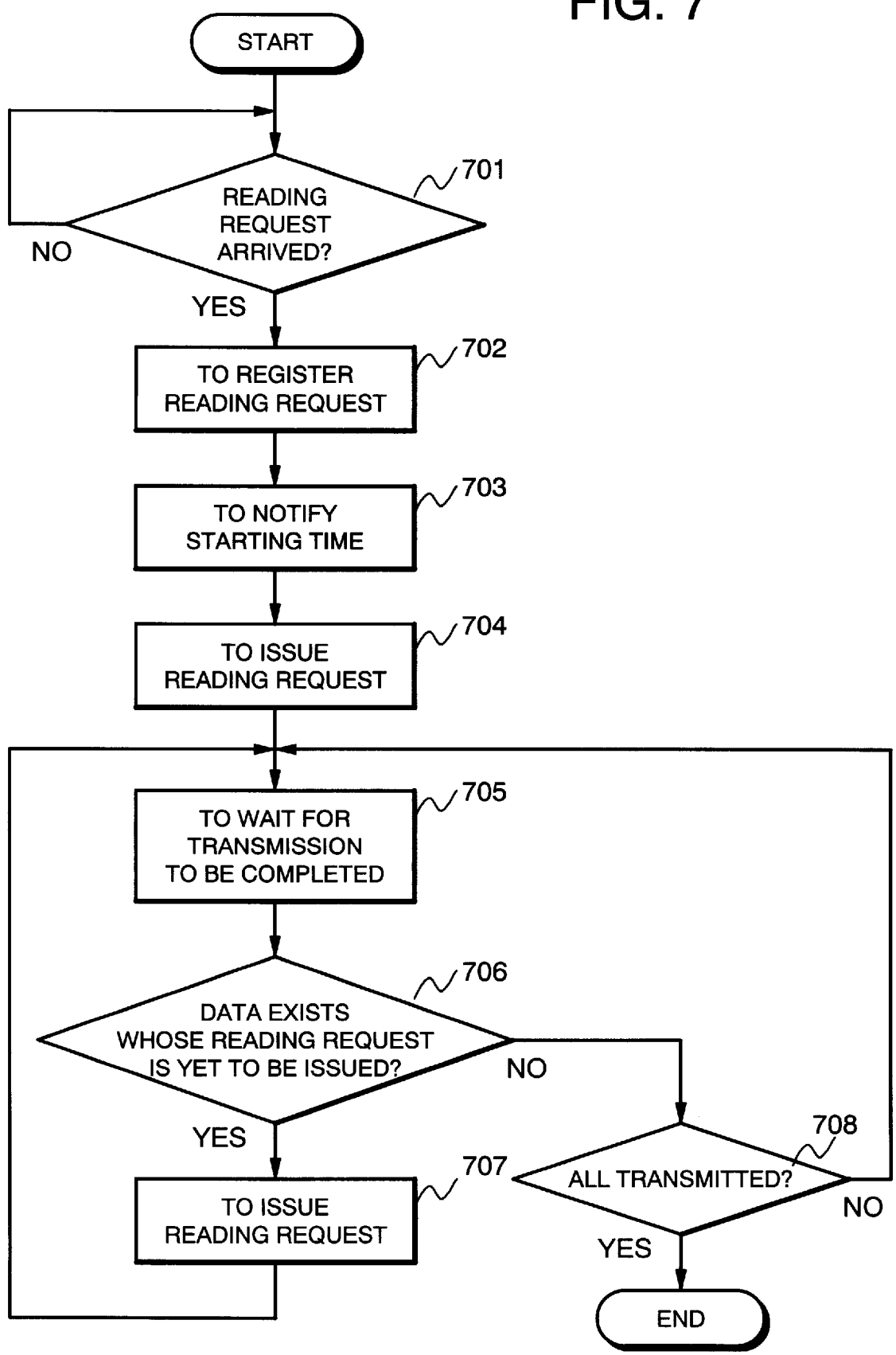
FIG. 7 is a flow chart showing operation of a time designated request management unit.

FIG. 7 is a flow chart showing operation of reading request issuing processing by the time designated request management unit 51.

With reference to FIG. 7, upon receiving a successive reading request from the client 40, the time designated request management unit 51 registers the received successive reading request at an internal memory, for example (Steps 701 and 702). The unit 51 then notifies the data transfer unit 54 of a read time attached to the registered successive reading request as a transfer starting time of a designated file (Step 703). Thereafter, the unit 51 checks a free capacity of the transmission buffer 53 to issue a request for reading as many blocks as can be stored in the free area (Step 704). Here, Steps 703 and 704 may be conducted in parallel. The unit 51 then waits for a transfer completion notification indicative of the end of transfer of data of one block out of the data stored in the transmission buffer 53 (Step 705). Reception of this notification enables the unit 51 to confirm that one block free area is generated in the transmission buffer 53.

Upon receiving the transfer completion notification, the unit 51 determines, with respect to a file to which the transferred block belongs, whether there exists data whose reading request is yet to be issued (Step 706). When data exists whose reading request is yet to be issued with respect to the relevant file, the unit 51 issues a reading request regarding the subsequent block of the file in question (Step 707) to again enter a transmission completion notification waiting state (Step 705).

When reading requests are already issued with respect to all the blocks in the file designated by the successive reading request, determination is made whether blocks corresponding to these reading requests have been all transmitted to the client (Step 708). If the transmission is not completed, the unit 51 enters the transmission completion notification waiting state (Step 705). When transmission is completed with respect to all the blocks, processing in response to the relevant successive reading request is finished.

The time designated request management unit 51 stores, in the internal memory, various information regarding a successive reading request received from the client 40. Information to be stored at least includes a name for identifying a transfer object file designated by a successive reading request, an identifier of a block whose reading request is issued last, and a deadline time of the last issued reading request. The unit 51 further stores various information, for example, the data amount of data whose reading request is yet to be issued, the data amount of data yet to be transferred to a client, and an occupied area in the transmission buffer 53. A maximum number of successive reading requests which can be processed simultaneously by the data reading device is defined by the capacity of the internal memory in the time designated request management unit 51 which stores these information.

Before issuing a reading request regarding each block, the time designated request management unit 51 causes the transmission time computing unit 52 to compute a time for transmitting data of a relevant block to the client 40. Then, the unit 51 issues a reading request of the relevant block, with the computed time as a deadline time of the block. Furthermore, at the time of issuing a block reading request, the time designated request management unit 51 reads, from the internal memory, a deadline time of a reading request issued the last time, that is, a reading request of a block immediately preceding the block in question in the file to which the block in question belongs to and notifies the transmission time computing unit 52 of the deadline time.

Operation for calculating a deadline time of the first block of a file designated by a successive reading request differs from that for calculating a deadline time of the second and the following blocks. The deadline time to be attached to a reading request of the first block is represented by the following expression (1), where $T_1$ denotes a deadline time corresponding to the first block, a suffix number denotes a block number indicative of the first block of the file, and $T_{req}$ denotes a read starting time designated by a successive reading request.

$$T_1 = T_{req} \tag{1}$$

Deadline times of the second and the following blocks are obtained by the following expression (2), where $T_N$ represents a deadline time of a reading request to be issued this time, $T_{N-1}$ represents a deadline time of a reading request issued the last time, L represents a data size of the preceding block, and s represents a data transfer rate defined in the present system. The data transfer rate "s" is constant in the system and preset in accordance with a transfer rate of a file stored in the storage device 10.

$$T_N = T_{N-1} + (L/s) \tag{2}$$

As described in the foregoing, time obtained by adding a time required for transferring data of a block in question to a deadline time of a block located immediately preceding the block in question is taken as a deadline time of the block in question. This results in reading data of the subsequent block from the storage device 10 onto the transmission buffer 53 by the time the transfer of the preceding block is completed.

The transmission buffer 53 is managed as a plurality of divisional areas, of which a fixed amount of areas are allotted to each successive reading request. At the time of transferring data in the transmission buffer 53 to the client 40 by the data transfer unit 54, an area of the transmission buffer where the data to be transferred is stored is unitarily recognized by designating the transfer of data corresponding to a successive reading request.

Figure 8:
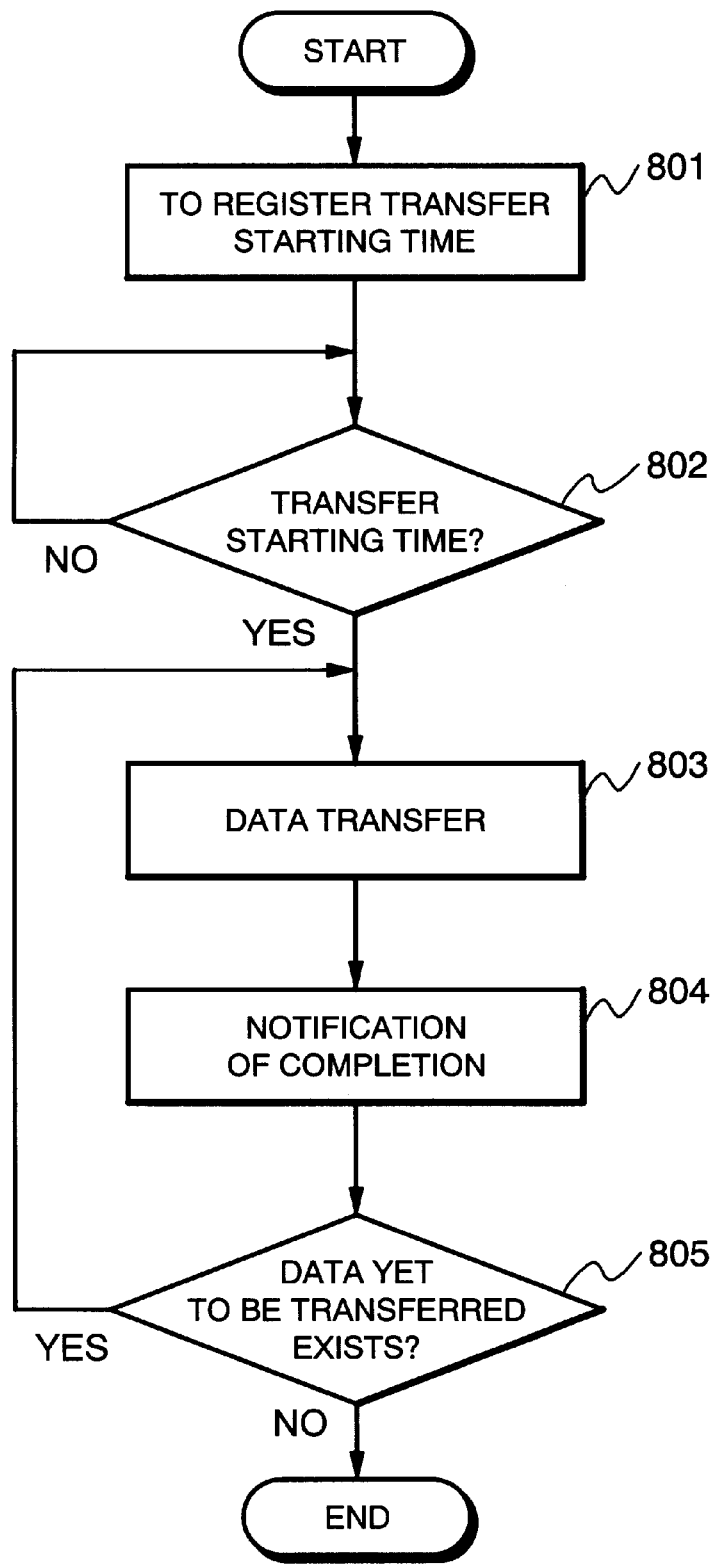
FIG. 8 is a flow chart showing operation of a data transfer unit.

FIG. 8 is a flow chart showing operation of data transfer processing by the data transfer unit 54.

With reference to FIG. 8, when notified of a transfer starting time by the time designated request management unit 51, the data transfer unit 54 registers the received time at the internal memory (Step 801). Then, the unit 54 compares the transfer starting time and the current time obtained from the internal clock to wait for the transfer starting time to come (Step 802). At the transfer starting time, the unit 54 starts transferring data of the first block in the corresponding file (Step 803). Then, upon completion of the data transfer of one block, the unit 54 sends a completion notification indicative of the completion of data transfer to the time designated request management unit 51 (Step 804). Next, determination is made whether there exists a block yet to be transferred which belongs to the same file (Step 805) and if it exists, the routine returns to Step 804 to continue data transfer. On the other hand, when no block to be transferred exists, processing is completed.

Operation of the read control device 20 is the same as that of the read control device 20 described in the first embodiment. Therefore, a reading request on a block basis received from the time designated request management unit 51 is stored in the queue of the reading request sorting unit 21 and in descending order of deadline times, data of a corresponding block is read from the storage device 10 and stored in the transmission buffer 53. Provision of the transmission buffer 53 enables data reading from the storage device 10 at a convenient time prior to the time for actually transferring the data to the client 40. This makes it possible to conduct parallel processing of a plurality of successive reading requests in time-divisional manner when a time required for reading data of one block from the storage device 10 is shorter than a time required for transferring data of one block.

In addition, since the reading priority order of each block is managed according to a deadline time, data of each block can be read onto the transmission buffer 53 by the time for starting data transfer even when a plurality of successive reading requests are processed in parallel. It is accordingly possible to make the most of the reading processing throughput of the storage device 10, as well as reducing the cases where data reading fails to keep the deadline time.

Figure 9:
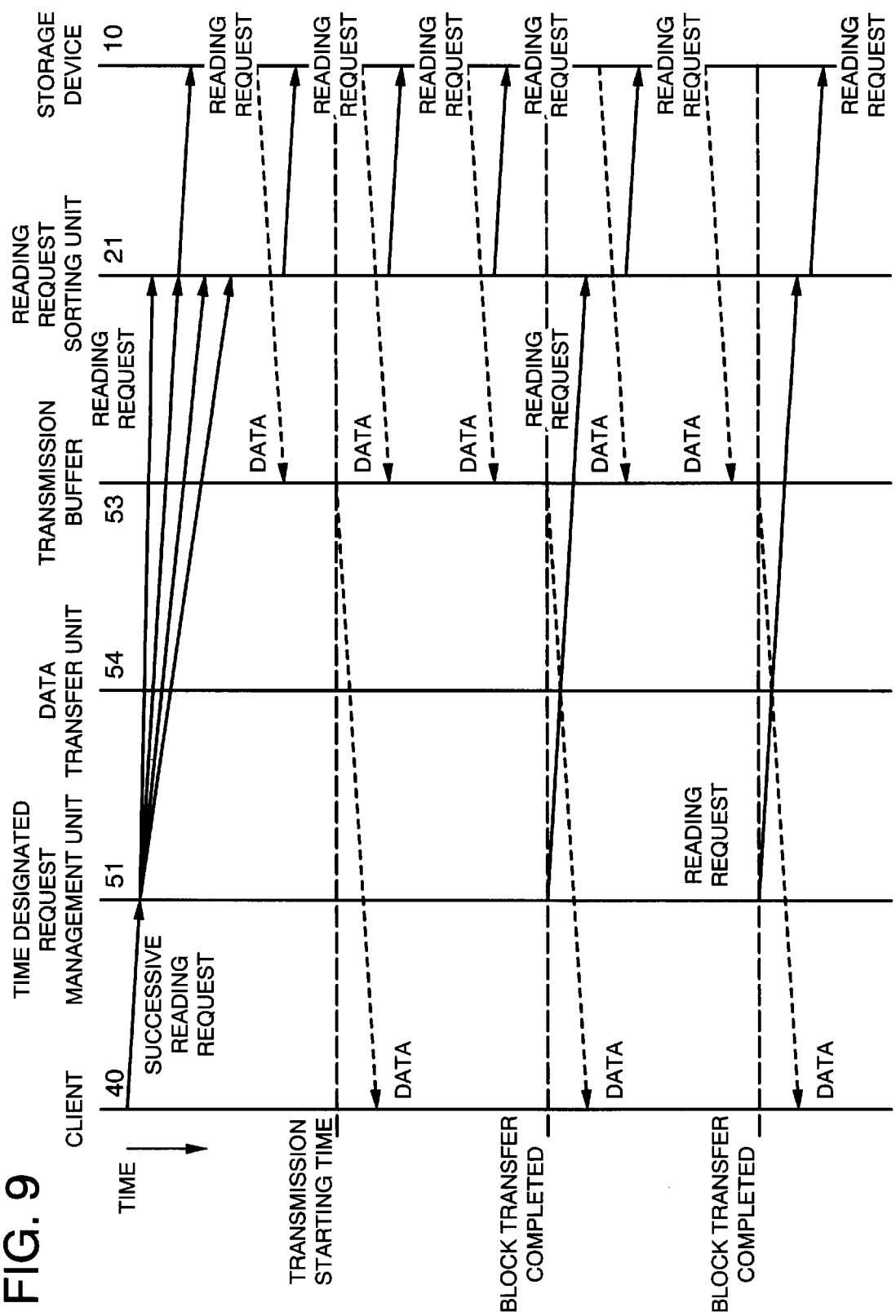
FIG. 9 is a diagram for use in explaining a sequence of data reading processing in the second embodiment.

FIG. 9 is a time chart showing a sequence of data reading according to the second embodiment. In FIG. 9, the ordinates from the left of the figure represent a time series of the processing by the client 40, the time designated request management unit 51, the data transfer unit 54, the transmission buffer 53, the reading request sorting unit 21 and the storage device 10. Time passes downward on the ordinates in the figure.

With reference to FIG. 9, first, the client 40 sends a file name, a transfer starting position in the file in question and a successive reading request which designates a read time of the first block to the time designated request management unit 51.

Upon receiving the successive reading request in question, the time designated request management unit 51 issues, to the reading request sorting unit 21, reading requests of as many blocks as can be stored in an area allotted to a requesting client out of the storage area of the transmission buffer 53. At this time, deadline time for each block is obtained by the transmission time computing unit 52 and the obtained deadline time information is attached to a reading request of each block.

The reading request sorting unit 21 stores a sent reading request in the internal queue. Then, the unit 21 fetches a reading request from the queue in descending order of deadline times and sends the request to the storage device 10. The storage device 10 reads data of the corresponding block and stores the same in the transmission buffer 53. Upon completion of reading of one block by the storage device 10, a reading request with the second earliest deadline time is fetched from the queue of the reading request sorting unit 21 to repeat reading of the relevant block from the storage device 10. When no reading request is stored in the queue, the unit enters a reading request waiting state.

At the transmission starting time, the data transfer unit 54 transfers data stored in the transmission buffer 53 to the client 40. Upon completion of the transfer of the data at the block transfer completion time, a free area equivalent to one block is generated in the transmission buffer 53. Then, the free area is designated and a request for reading the subsequent block is issued from the time designated request management unit 51 to the reading request sorting unit 21.

Every time a reading request is issued, deadline time corresponding to the relevant block is obtained by the transmission time computing unit 52. Repetition of such operation results in successive transfer of the data of a requested file to the client.

In an steady state after a lapse of a fixed time after a successive reading request of a file is transmitted to the client 40, a deadline margin time can be set to be long by increasing the capacity of the transmission buffer. This is so called forecasting control using a buffer. Such processing enables the transmission buffer 53 to fully compensate for a variation in a reading rate of the storage device 10, a fluctuation in time required for reading each block caused due to an avalanche of access to one storage device 10, etc. It is therefore possible to obtain a high throughput approximate to the limit of the performance of the storage device 10 while keeping the deadline time.

On the other hand, since the transmission buffer 53 is approximately empty in a transition period from the reception of a successive reading request until the steady state, a deadline margin time of each block is relatively short. However, data is quickly accumulated in the transmission buffer 53 because as many reading requests as the number equivalent to an empty area existing in the transmission buffer 53 are issued and their deadline margin times are short. In other words, a reading request issued during a transition period has a shorter deadline margin time than that of a reading request corresponding to a successive reading request from other client being processed in parallel and therefore the former request is given priority for processing over the latter to rapidly accumulate data in the transmission buffer 53. As a result, even if a time before the time limit for reading the first block of a designated file is relatively short and many other reading processings reaching the steady state are conducted in parallel, it is possible to transfer data of the first block to the client by the designated time.

In general, with files each being of larger than a fixed size, simultaneous and successive reading of a plurality of files will result in having the number of reading processings reaching the steady state larger than that of reading processings in a transition state. The number of high-priority reading requests issued in transitional reading processing per unit time is small enough accordingly. It is therefore possible, by setting the transmission buffer to have a large capacity, to reduce the possibility that reading processing for low-priority reading requests issued in steady-state reading processing fails to keep the deadline time, even if high-priority reading requests are issued in transitional reading processing.

As described in the foregoing, in a case of successively reading file data without intermission, it is possible to reduce a time period before the transfer of the first block data is started toward the client in response to a subsequent reading request. At the same time, improvement of a throughput approximate up to the limit of the performance of the storage device 10 can be achieved.

In the present embodiment, while only one data transfer unit 54 is illustrated for the convenience of explanation, the unit is in practice provided in a number corresponding to the number of clients to enable simultaneous data transfer to a plurality of clients. In addition, the successive transfer control device 50 and the read control device 20 may be incorporated with each other or the successive transfer control device 50 may be incorporated into the client 40 side.

While in the present embodiment, a fixed amount of storage areas of the transmission buffer 53 is allotted to each successive reading request, buffer size to be allotted according to the number of successive reading requests being processed may be dynamically modified. In this case, the time designated request management unit 51 will manage allocation of the areas of the transmission buffer 53. With a small number of successive reading requests being processed, a margin time period from the issuance of a reading request of each block until the transfer of the same can be extended by increasing a buffer size to be allotted to one request, thereby further reducing the cases where reading processing fails to keep the deadline time.

Figure 10:
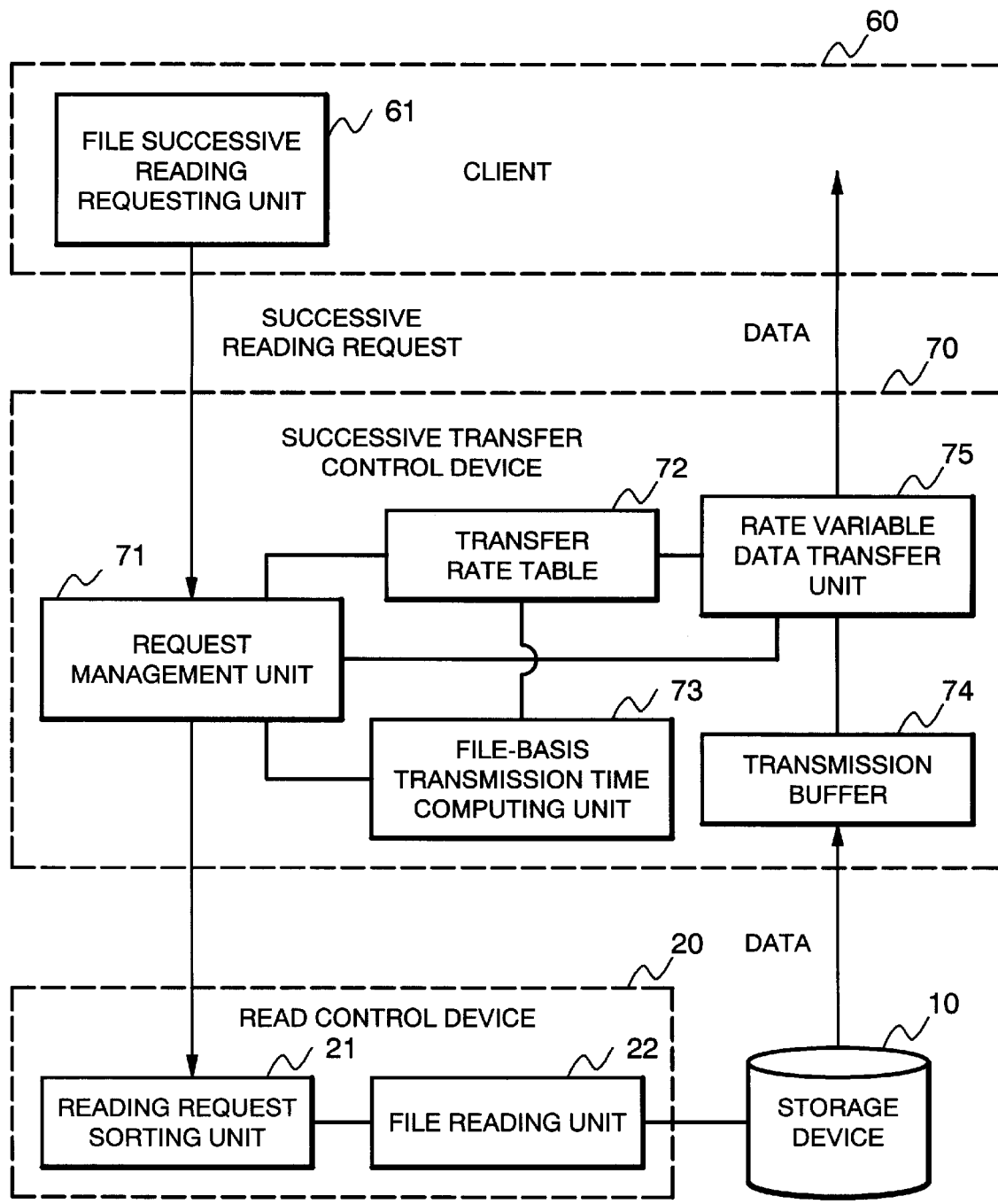
FIG. 10 is a block diagram showing structure of a data reading device according to a third embodiment of the present invention.

FIG. 10 is a block diagram showing structure of a data reading device according to a third embodiment of the present invention.

In the third embodiment, a transfer rate is registered in advance for each file stored in the storage device and a file designated by a successive reading request is transmitted at a corresponding transfer rate to a client. Deadline time to be attached to a reading request of each block is obtained according to a transfer rate of the relevant file. This enables the third embodiment to cope with such a system for simultaneously and successively reading a plurality of files each having a different transfer rate as a video server system which deals with moving pictures of different coding formats.

The data reading device provided with the above-described functions according to the third embodiment includes, as shown in FIG. 10, a storage device 10 for accumulating data files, a read control device 20 for issuing reading instructions to the storage device 10, a client 60 as a sender of a file reading request, and a successive transfer control device 70 for dividing reading requests into reading requests on a block basis. In the above-described structure, the storage device 10 and the read control device 20 are structured similarly to those of the first embodiment shown in FIG. 1 and the same reference numerals are allotted thereto to omit their description. In FIG. 10, illustration is made only of a characteristic part of the structure of the present embodiment and that of the remaining common part is not made.

The client 60 includes a file successive reading requesting unit 61 for issuing a reading request which designates a file to be read. In the following description, a reading request issued by the file successive reading requesting unit 61 is referred to as a successive reading request.

The successive transfer control device 70 includes a request management unit 71 for receiving successive reading requests from the client 60 and dividing them into reading requests on a block basis, a transfer rate table 72 for storing a transfer rate for each file, a file-basis transmission time computing unit 73 for obtaining time for starting data transfer with respect to each block, a transmission buffer 74 for temporarily holding data read from the storage device 10, and a rate variable data transfer unit 75 for transferring data stored in the transmission buffer 74 to the client 60 at a transfer rate corresponding to the file in question at a designated time.

The request management unit 71 has a clock provided therein and calculates a time by adding a time of the reception of a successive reading request from the client 60 to a deadline margin time prescribed in advance for the system. The calculated time is set as a transfer starting time for starting transfer of a file whose reading is requested. The deadline margin time prescribed for the system is predetermined based on the capacity of the transmission buffer 74, the throughput of the storage device 10, etc. An average deadline margin time of the system in the steady state may be set as a deadline margin time for the first block.

In addition, the request management unit 71 notifies the rate variable data transfer unit 75 of the transfer starting time obtained by adding the current time and the deadline margin time of the system. The unit 71 also obtains a deadline time of each block by means of the file-basis transmission time computing 73 based on the transfer starting time to issue a reading request with the information of a deadline time of each block attached thereto.

In the transfer rate table 72, a transfer rate of each file stored in the storage device 10 is registered in advance. At the time of storing a file in the storage device 10, a transmission rate of the file is registered in the transfer rate table 72.

The rate variable data transfer unit 75 has a clock provided therein and at the transfer starting time notified by the request management unit 71, transfers data of the corresponding file from the transmission buffer 74 to the client 60. At this time, its transfer rate is obtained with reference to the transfer rate table 72.

The read control device 20 includes, similarly to the read control device 20 of the first embodiment shown in FIG. 1, a reading request sorting unit 21 and a file reading unit 22.

Figure 11:
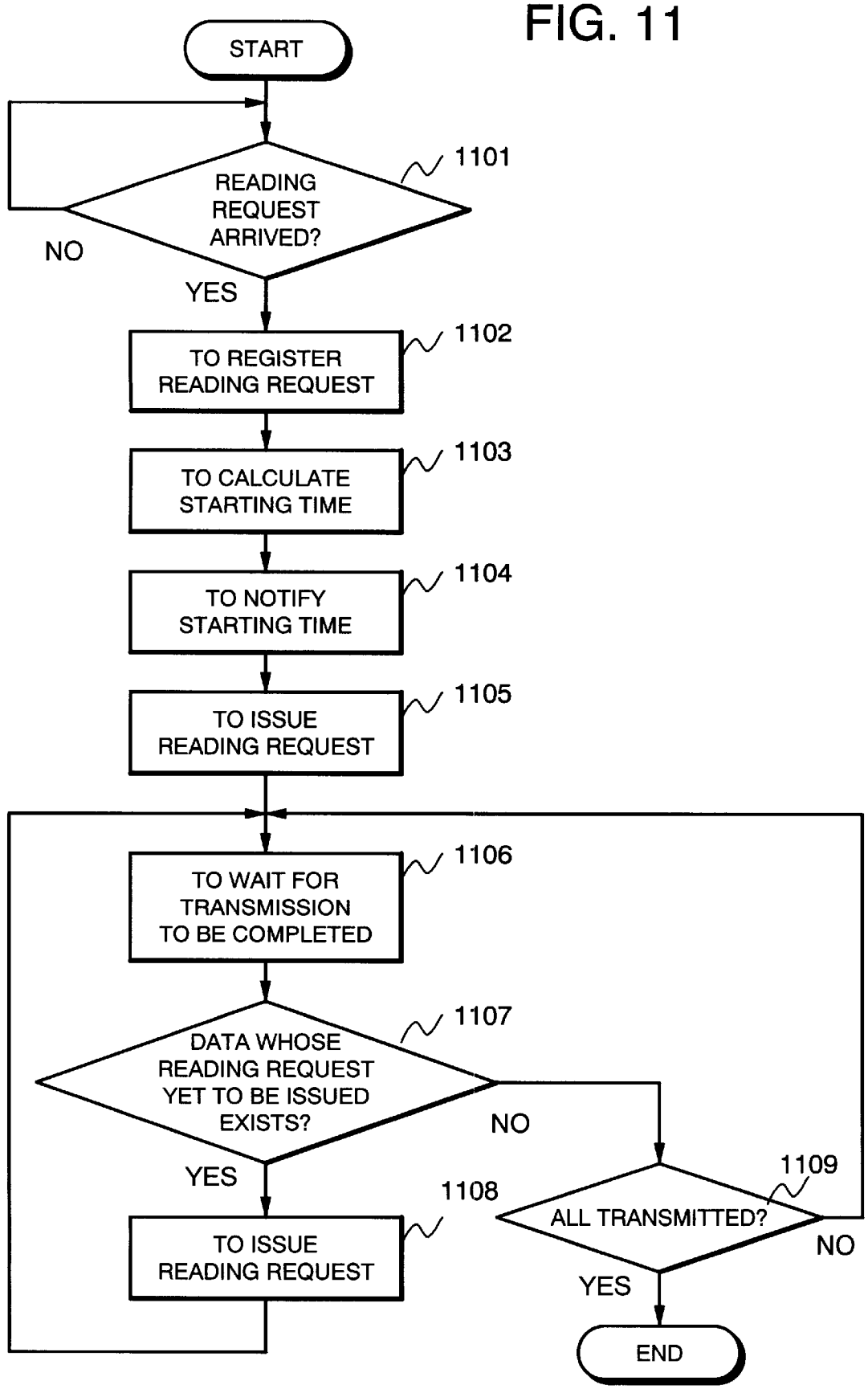
FIG. 11 is a flow chart showing operation of a request management unit.

FIG. 11 is a flow chart showing operation of reading request issuing processing by the request management unit 71.

With reference to FIG. 11, upon receiving a successive reading request from the client 60, the request management unit 71 registers the received successive reading request at an internal memory, for example (Steps 1101 and 1102). The unit 71 then calculates a time by adding the deadline margin time prescribed for the system to the current time (Step 1103) and notifies the rate variable data transfer unit 75 of the calculated time as a transfer starting time of a designated file (Step 1104). Thereafter, the unit 71 checks a free capacity of the transmission buffer 74 to issue a request for reading as many blocks as can be stored in the free area (Step 1105). Here, the notification of a transfer starting time at Step 1104 and the issuance of a reading request at Step 1105 may be conducted at the same time. The unit 71 then waits for a transfer completion notification indicative of the end of transfer of data of one block out of the data stored in the transmission buffer 74 (Step 1106). Reception of this notification enables the unit 71 to confirm that one block free area is generated in the transmission buffer 74.

Upon receiving the transfer completion notification, the unit 71 determines, with respect to a file to which the transferred block belongs, whether there exists data whose reading request is yet to be issued (Step 1107). When data exists whose reading request is yet to be issued in the relevant file, the unit 71 issues a reading request regarding the subsequent block of the file in question (Step 1108) to again enter the transmission completion notification waiting state (Step 1106).

When reading requests are already issued with respect to all the blocks in the file designated by the successive reading request, determination is made whether blocks corresponding to these reading requests have been all transmitted to the client (Step 1109). If the transmission is not completed, the unit 71 enters the transmission completion notification waiting state (Step 1106). When transmission is completed with respect to all the blocks, processing in response to the successive reading request in question is finished.

The request management unit 71 stores, in the internal memory, various information regarding a successive reading request received from the client 60. Information to be stored at least includes name for identifying a transfer object file designated by a successive reading request, an identifier of a block whose reading request is issued last, and a deadline time of the lastly issued reading request. The unit 71 further stores various information such as the data amount of data whose reading request is yet to be issued, the data amount of data yet to be transferred to a client, and an occupied area of the transmission buffer 74. A maximum number of successive reading requests which can be processed simultaneously by the data reading device is defined by the capacity of the internal memory in the request management unit 71 which stores these information.

Before issuing a reading request regarding each block, the request management unit 71 causes the file-basis transmission time computing unit 73 to compute a time for transmitting data of a relevant block to the client 60. Then, the unit 71 issues a reading request of the block, with the computed time as a deadline time of the block. Furthermore, the request management unit 71, at the time of issuing a block reading request, reads, from the internal memory, a deadline time of a reading request issued the last time, that is, a reading request of the block immediately preceding the block in question in the file to which the block in question belongs to and notifies the file-basis transmission time computing unit 73 of the deadline time.

The deadline time of the first block in a file designated by a successive reading request is a previously obtained transfer starting time and is obtained by the following expression (3), where $T_{start}$ denotes a deadline time corresponding to the first block, $T_{current}$ denotes a current time when a successive reading request is received from a client and t denotes a deadline margin time prescribed for the system.

$$T_{start} = T_{current} + t \tag{3}$$

Deadline times of the second and the following blocks are obtained by the following expression (4), where $T_N$ represents a deadline time of a reading request to be issued this time, $T_{N-1}$ represents a deadline time of a reading request issued the last time, L represents a data size of the preceding block, and $s_j$ represents a transfer rate of a file registered at the transfer rate table 72.

$$T_N = T_{N-1} + (L/s_j) \tag{4}$$

As described in the foregoing, since a deadline time is obtained dependently on a file transfer rate, transfer of each block can be started at a time corresponding to a file transfer rate. This results in reading data of the subsequent block from the storage device 10 onto the transmission buffer 74 by the time the transfer of the preceding block is completed.

Figure 12:
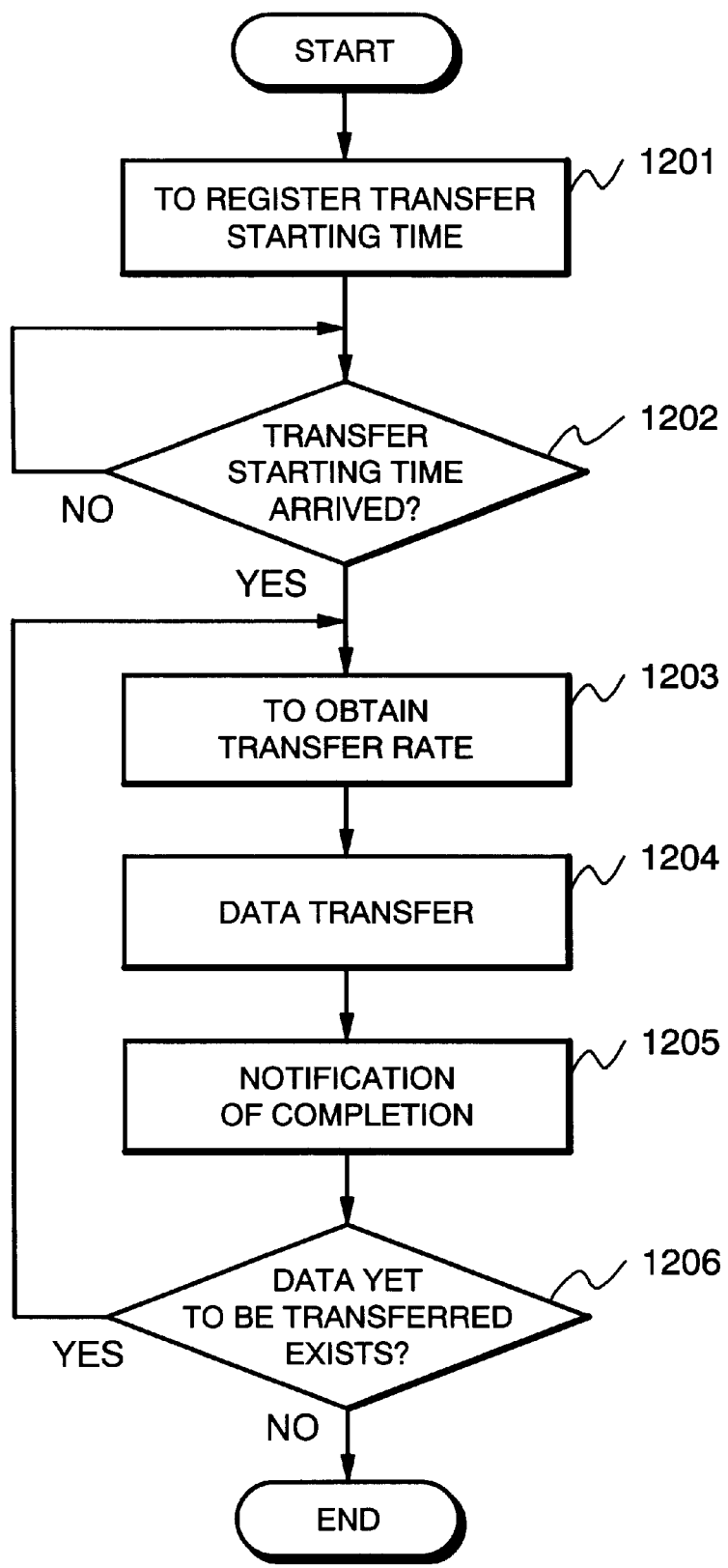
FIG. 12 is a flow chart showing a flow of processing conducted by a rate variable data transfer unit.

FIG. 12 is a flow chart showing operation of data transfer processing by the rate variable data transfer unit 75.

With reference to FIG. 12 showing a flow of the operation, when notified of a transfer starting time by the request management unit 71, the data transfer unit 75 registers the received time at the internal memory (Step 1201). Then, the unit 75 compares the transfer starting time and the current time obtained from the internal clock to wait for the transfer starting time to come (Step 1202). At the transfer starting time, the unit 75 obtains a transfer rate of the relevant file with reference to the transfer rate table 72 (Step 1203) and transfers data of the first block at the obtained transfer rate (Step 1204). Then, upon completion of the data transfer of one block, the unit 75 sends a completion notification indicative of the completion of data transfer to the request management unit 71 (Step 1205). Next, determination is made whether there exists a block yet to be transferred which belongs to the same file (Step 1206) and if it exists, the routine returns to Step 1205 to continue data transfer. On the other hand, when no block to be transferred exists, processing is completed.

In the foregoing description, although the rate variable data transfer unit 75 and the request management unit 71 are both designed to have a clock, either one clock may be shared by the two units.

Operation of the read control device 20 is the same as that of the read control device 20 described in the first embodiment. Therefore, data is sequentially read in descending order of deadline times of their reading requests and stored in the transmission buffer 74. Each file is read on a block basis in descending order of deadline times and transferred to the client 60 at a transfer rate registered corresponding to the file in question.

In the third embodiment, the rate variable data transfer units 75 is provided in a number corresponding to the number of the clients 60 so as to simultaneously transfer data to a plurality of clients. Moreover, the successive transfer control device 70 may be incorporated into the read control device 20 or the client 60.

As described in the second embodiment, it is also apparent in the third embodiment that buffer size to be allotted according to the number of successive reading requests being processed may be dynamically changed. It is also possible to allot a buffer size according to a file transfer rate. In other words, more buffer areas are allotted to a higher transfer rate. It is further possible to dynamically modify the size of a buffer area to be allotted, based both on the number of successive reading requests and a transfer rate of a designated file.

Since in the third embodiment, forecasting control using a transmission buffer is conducted in the steady state, a high throughput approximate to the limit of the performance of the storage device 10 can be obtained. In the steady state, in addition, a margin time period before a deadline time which is attached to a reading request is equivalent to a transfer time of data already stored in the transmission buffer 74. A file with a high transfer rate, therefore, has a shorter margin time period before the deadline time than that of a file with a low transfer rate even if both have the same amount of data already stored in the transmission buffer, and the former file is given priority for reading accordingly.

As a result, there occurs less often a case where even a file with a high transfer rate fails to keep a deadline time. In addition, since even a file with a low transfer rate is given priority for processing when the deadline time draws near, data can be transmitted to a client by the deadline time.

As described in the foregoing, in a case of successively reading data of a file, the third embodiment enables a throughput to be increased approximately up to the limit of the performance of the storage device 10, as well as enabling a plurality of files with different transfer rates to be simultaneously dealt with.

Figure 13:
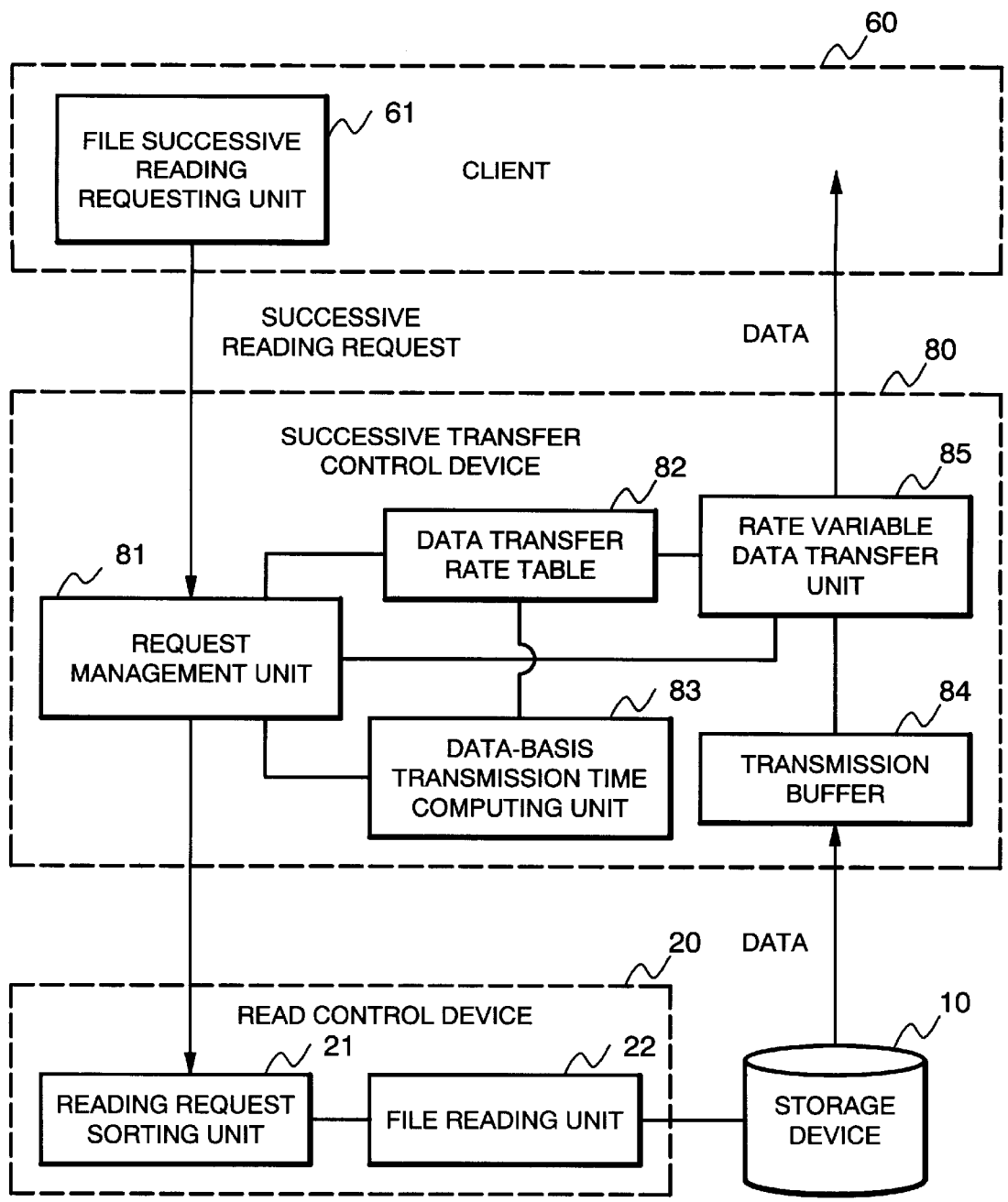
FIG. 13 is a block diagram showing structure of a data reading device according to a fourth embodiment of the present invention.

FIG. 13 is a block diagram showing structure of a data reading device according to a fourth embodiment of the present invention.

According to the fourth embodiment, transfer rate can be changed on a basis of a block included in each file. This allows the fourth embodiment to set a transfer rate more flexibly than that in the third embodiment in which a transfer rate of a client is determined on a file basis. The device according to the fourth embodiment therefore can cope with data whose amount per unit time varies such as image data coded based on a difference from a preceding frame, for example.

The data reading device provided with the above-described functions according to the fourth embodiment includes, as shown in FIG. 13, a storage device 10 for accumulating data files, a read control device 20 for issuing reading instructions to the storage device 10, a client 60 as a sender of a file reading request, and a successive transfer control device 80 for dividing reading requests into reading requests on a block basis. Since in the above-described structure, the storage device 10 and the read control device 20 are structured similarly to those of the first embodiment shown in FIG. 1 and the client 60 is structured similarly to that of the third embodiment shown in FIG. 10, the same reference numerals are allotted thereto to omit their description. In FIG. 13, illustration is made only of a characteristic part of the structure of the present embodiment and that of the remaining common part is not made.

The successive transfer control device 80 includes a request management unit 81 for receiving successive reading requests from the client 60 and dividing them into reading requests on a block basis, a data transfer rate table 82 for storing a transfer rate for each block constituting a file, a data-basis transmission time computing unit 83 for obtaining time for starting data transfer with respect to each block, a transmission buffer 84 for temporarily holding data read from the storage device 10, and a rate variable data transfer unit 85 for transferring data stored in the transmission buffer 84 to the client 60 at a transfer rate corresponding to the file in question at a designated time. Of the above-described components, the request management unit 81, the transmission buffer 84 and the rate variable data transfer unit 85 are the same as the request management unit 71, the transmission buffer 74 and the rate variable data transfer unit 75 of the successive transfer control device 80 according to the third embodiment shown in FIG. 10.

In the data transfer rate table 82, a transfer rate of each file stored in the storage device 10 is registered in advance for each block constituting the file. At the time of storing a file in the storage device 10, a transmission rate of each block in the file in question is registered at the transfer rate table 82.

Operation of the fourth embodiment is the same as that of the above-described third embodiment with the only difference being that a deadline time of each block is calculated based not on a transfer rate of each file but on a transfer rate of each block. The data-basis transmission time computing unit 83 obtains, from the request management unit 81, a deadline time attached to a block reading request issued the last time with respect to the same file and obtains, from the data transmission rate table 82, a transfer rate corresponding to the block issued the last time. With these information, the data-basis transmission time computing unit 83 computes a deadline time of a reading request.

As a deadline time corresponding to the first block of a file whose successive reading is requested, a transfer starting time $T_{start}$ is used which is calculated by the request management unit 81 according to the above-described expression (3). Deadline times to be attached to reading requests of the second and the following blocks will be expressed by the following equation (5), where $T_N$ represents a deadline time of a reading request to be issued this time, $T_{N-1}$ represents a deadline time attached to the reading request issued the last time, L represents a data size of the preceding block and $s_{j(N-1)}$ represents a transfer rate of the preceding block, that is, the (N−1)th block in a file identified by $s_j$.

$$T_N = T_{N-1} + L/s_{j(N-1)} \quad (5)$$

Operation of a reading request sorting unit 21, a file reading unit 22 and the storage device 10 is the same as that of the counterparts shown in the above-described first embodiment. More specifically, reading requests are processed in descending order of deadline times to read data and store the same in the transmission buffer 84. At the time of transmitting data of each block to a client, the rate variable data transfer unit 85 obtains a transfer rate corresponding to the block in question from the data transfer rate table 82 and transfers the data to the client 60 at the obtained transfer rate.

Each file is thus transferred to a client at a transfer rate registered in advance for each block included in the relevant file. Since a deadline time is obtained based on a transfer rate of an immediately preceding block in the same file, reading of the data of the subsequent block and storage of the same in the transmission buffer 84 are finished before transfer of the immediately preceding block is completed. This enables even a file whose data amount per unit time varies, such as image data coded based on a difference from a preceding frame, to be transferred at a transfer rate corresponding to the data amount.

In the fourth embodiment as well as the abovedescribed second and third embodiments, size of a buffer to be allotted may be dynamically changed according to the number of successive reading requests being processed, a transfer rate, etc. In addition, the successive transfer control device 80 may be incorporated into the read control device 20 or the client 60.

Use of a data transfer rate table allows the fourth embodiment to manage a transfer rate on a block basis. Since forecasting control using a transmission buffer is conducted in the processing reaching the steady state, the present embodiment can achieve a high throughput approximate to the limit of the performance of the storage device 10. In the steady state, a margin time period from the issuance of a reading request until its deadline time is equivalent to a time required for transferring data already stored in the transmission buffer 84. When more than certain amount of data is already stored in the transmission buffer 84, a deadline margin time approximates to a margin time obtained at an average transfer rate of the file as a whole even if transfer rate varies with a block. It is therefore possible to transfer data to a client by the deadline time.

When a plurality of reading processings in the steady state are conducted in parallel, a deadline margin time ordinarily approximates to a deadline margin time obtained in a case where a block is transferred at an average transfer rate of a file. When block reading with a high transfer rate successively occurs at a predetermined client 60 to make a deadline margin time have a value smaller than an average transfer rate, reading processing for the client 60 in question is given priority. Even when block reading with a high transfer rate succeeds one after another, it is therefore possible to transfer data to the client 60 by a fixed time. On the other hand, when blocks with a low transfer rate follow one after another, their priority becomes higher as time passes, whereby data transfer by a fixed time is possible.

Thus, in a case of successively reading data of a file, the present embodiment enables a throughput to be increased approximately to the limit of the performance of the storage device 10, as well as enabling a plurality of files with different transfer rates to be simultaneously dealt with on a block basis.

Figure 14:
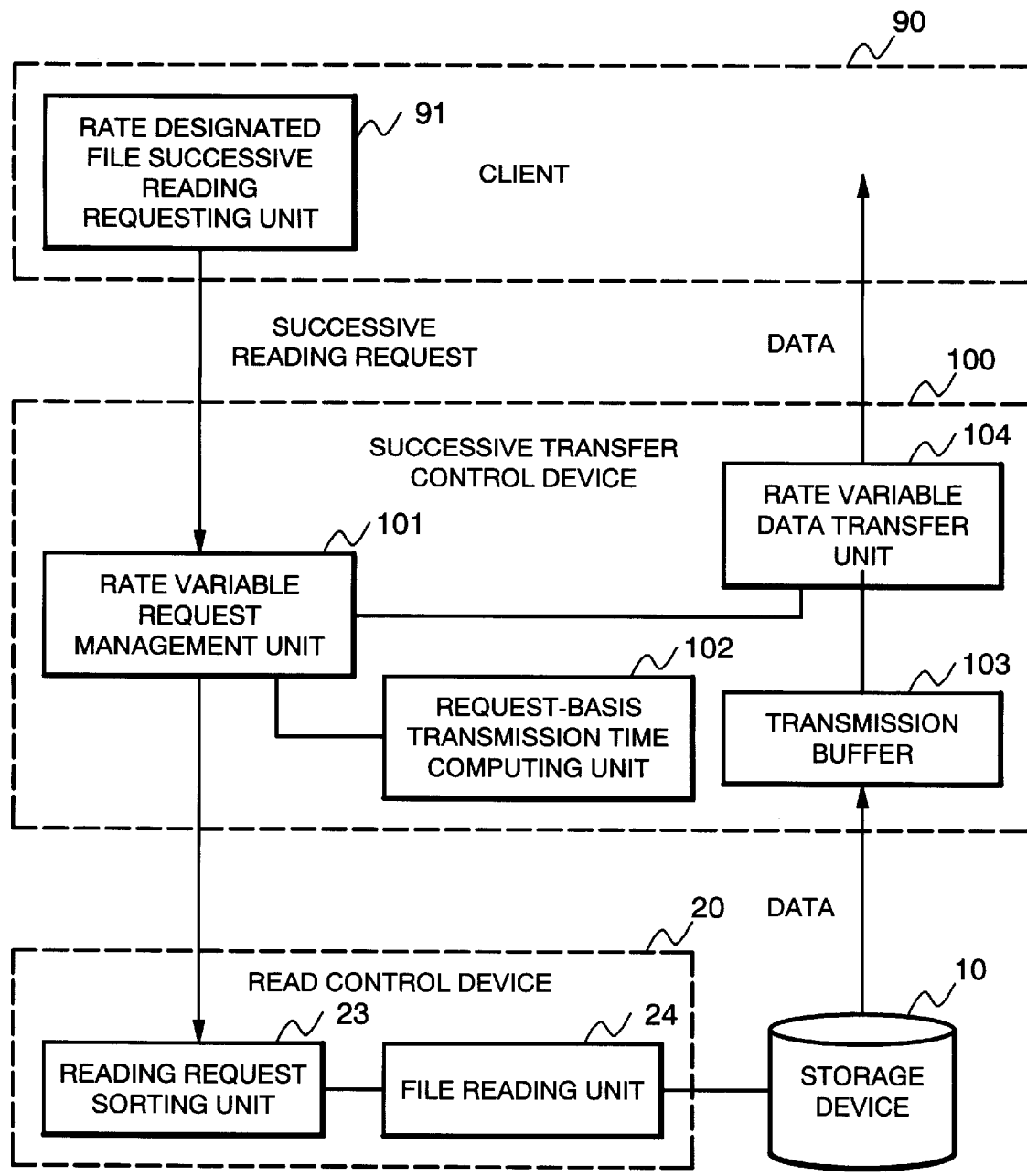
FIG. 14 is a block diagram showing structure of a data reading device according to a fifth embodiment of the present invention.

FIG. 14 is a block diagram showing structure of a data reading device according to a fifth embodiment of the present invention.

In the fifth embodiment, every time a client issues a file reading request, it designates a transfer rate of the file. Designation of a transfer rate by a client allows the same file to be read at different transfer rates at the time of switching between high-speed video reproduction and low-speed video reproduction, for example.

The data reading device provided with the above-described functions according to the fifth embodiment includes, as shown in FIG. 14, a storage device 10 for accumulating data files, a read control device 20 for issuing reading instructions to the storage device 10, a client 90 as a sender of a file reading request, and a successive transfer control device 100 for dividing reading requests into reading requests on a block basis. In the above-described structure, the storage device 10 and the read control device 20 are structured similarly to those of the first embodiment shown in FIG. 1 and the same reference numerals are allotted thereto to omit their description. In FIG. 14, illustration is made only of a characteristic part of the structure of the present embodiment and that of the remaining common part is not made.

The client 90 includes a rate designated file successive reading requesting unit 91 for issuing a reading request to which information designating a transfer rate of a file to be read is attached. In the following description, a reading request issued by the rate designated file reading requesting unit 91 is referred to as a successive reading request.

The successive transfer control device 100 includes a rate variable request management unit 101 for dividing successive reading requests into reading requests on a block basis, a request-basis transmission time computing unit 102 for computing a time for starting data transfer with respect to each block, a transmission buffer 103 and a data transfer unit 104 for transferring data stored in the transmission buffer 103 at a transfer rate designated by a client at a designated time.

The rate variable request management unit 101 has an internal memory provided therein to register a successive reading request received from the client 90. Information to be registered at least includes a successive reading request and transfer rate designation information attached to the reading request.

The request-basis transmission time computing unit 102 obtains, from the rate variable request management unit 101, a deadline time of a block immediately preceding a block to be issued this time, that is, a deadline time of a block issued the last time, and a transfer rate designated by the client 90 and computes a deadline time to be attached to a reading request of the block in question based on these information. As a deadline time corresponding to the first block of a file whose successive reading is requested, a transfer starting time $T_{start}$ is used which is computed by the rate variable request management unit 101 according to the above expression (3).

Deadline times to be attached to reading requests of the second and the following blocks in the same file are computed according to the following expression (6), where $T_N$ represents a deadline time of a reading request to be issued this time, $T_{N-1}$ represents a deadline time of a reading request issued the last time, L represents data size of the preceding block and sreq represents a transfer rate designated by a client.

$$T_N = T_{N-1} + L/s_{req} \qquad (6)$$

Operation of a reading request sorting unit 21, a file reading unit 22 and the storage device 10 is the same as that of their counterparts shown in the embodiment. More specifically, reading requests are processed in descending order of deadline times to read data and store the same in the transmission buffer 103. At the time of transmitting data of each block to the client 90, the rate variable data transfer unit 104 obtains a transfer rate designated by the client 90 from the rate variable request management unit 101 and transfers the data to the client 90 at the obtained transfer rate.

Each file is thus transferred at a transfer rate which is designated by a client and attached to a successive reading request. Also in the fifth embodiment, a buffer size to be allotted may be dynamically changed according to the number of successive reading requests being processed and a designated transfer rate. In addition, the successive transfer control device 100 may be incorporated into the read control device 20 or the client 90.

In the fifth embodiment, since forecasting control using a transmission buffer is conducted upon entering the steady state, high throughput approximate to the limit of the performance of the storage device 10 can be obtained. In the steady state, a margin time period before a deadline time to be attached to a reading request is equivalent to a transfer time of data already stored in the transmission buffer. A file with a high transfer rate therefore has a shorter margin time before a deadline time than a file with a low transfer rate even if both have the same amount of data already stored in the transmission buffer and the former file is accordingly given priority for reading.

As a result, there occur less often a case where even a file with a high transfer rate fails to keep a deadline time. Moreover, even a file with a low transfer rate is given priority for processing as the deadline time draws near, whereby data can be transmitted to the client 90 by the deadline time.

Furthermore, since the client 90 is capable of modifying a data transfer rate every time it issues a reading request, at the time of reading a video file, for example, it can receive supply of data at a reading rate matching a reproduction rate.

As described in the foregoing, since the data reading device of the present invention reads data in descending order of reading time limits attached to each reading request, it is unlikely that even when receiving reading requests from a plurality of clients, data reading is not completed by a designated time, which results in avoiding data intermission in the course of data transfer.

The present invention has another effect of reducing the cases where reading time limit is not kept, even when reading requests avalanche, thereby allowing the number of clients to be increased to enhance efficiency of the storage device.

In addition, provision of a transmission buffer for reading data divided into a plurality of blocks as well as temporarily accumulating and transferring read data enables, even when a plurality of reading requests are simultaneously issued, data reading to be processed on a block basis in a time divisional manner to cope with the plurality of reading requests in parallel.

As to the reading of each block, reading of a block with a large margin for a reading time limit is held over and a block with a small margin is given priority for reading. A block whose reading is held over is also given high priority when its time limit draws near. As a result, even when a plurality of reading requests are processed in parallel, situation can be avoided where data reading is not completed by a reading time limit.

The present invention has a further effect of allowing the same data reading device to deal with such data as a video file whose transfer rate varies with a coding format by setting a transfer rate for each file in advance to transfer a file designated by a reading request at the preset transfer rate and computing a read starting time and a reading time limit of each block according to a transfer rate of a read file.

A still further effect of dealing with such data with different transfer rates from one place to another in one file as an image file of moving picture coded according to a difference from a preceding frame can be achieved by setting a transfer rate for each block constituting a file to transfer each block of a file designated by a reading request to a requester at a corresponding transfer rate and obtaining a transfer starting time and a reading time limit based on a transfer rate of each block.

Moreover, a client designates a file transfer rate to issue a reading request and computes a transfer starting time for transferring each block of a requested file and a reading time limit based on the designated transfer rate, thereby coping with such a case where a transfer rate is changed by the designation of a client as high-speed and low-speed reproduction of the same video file.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A data reading device for accepting an external data transfer request, reading desired data from data storing means which stores various data and transferring the data to a sender of said data transfer request, the data reading device comprising:

reading request issuing means for issuing a reading request which designates a data file corresponding to said data transfer request;

reading request managing means for accepting said reading request to divide an object data file into data blocks of predetermined size and designating a time of a reading deadline for each data block to generate a reading request of each data block;

transmission time computing means for computing a transfer starting time for each said data block which is used as a time of the reading deadline for each said data block;

reading request sorting means for accepting and storing a reading request of each said data block generated by said reading request managing means to fetch the requests in descending order of the reading deadlines;

data reading means for reading data, corresponding to a reading request at each said data block to be fetched according to said reading request sorting means from said data storing means;

data holding means for temporarily holding data read by said data reading means; and data transferring means for detecting said data block whose transfer is to be started based on a transfer starting time of each said data block computed by said transmission time computing means and fetching said detected data block from said data holding means to transfer said data block to a sender of said data transfer request.

2. The data reading device as set forth in claim 1, wherein said reading request issuing means and said reading request managing means are provided in plural corresponding to the number of senders of said data transfer request, and said reading request sorting means accepts said reading request of each said block issued from said plurality of reading request managing means and fetches said reading request only according to the order of said reading deadlines whichever said reading request managing means issues the reading request.

3. The data reading device as set forth in claim 1, wherein said reading request sorting means comprising:

reading request storing means for storing a reading request of each said data block, and reading request inserting means for accepting a reading request of each said data block and comparing a reading deadline attached to the accepted reading request and a reading deadline attached to a reading request stored in said reading request storing means to insert said accepted reading request such that all the reading requests line in descending order of reading deadlines from the output side of said reading request storing means.

4. The data reading device as set forth in claim 1, wherein said reading request sorting means comprising:

reading request storing means for storing a reading request of each said data block, and reading request determining means for comparing reading deadlines attached to all the reading requests stored in said reading request storing means to determine a reading request with the earliest reading deadline as a first reading request to be fetched.

5. The data reading device as set forth in claim 1, wherein said reading request issuing means designates a read starting time for starting reading of a data file as an object of said reading request and attaches the designated time to said reading request, and said transmission time computing means computes a transfer starting time of data corresponding to a reading request of each said data block based on a read starting time attached to said reading request.

6. The data reading device as set forth in claim 1, further comprising transfer rate registering means for registering a transfer rate of a data file stored in said data storing means, wherein said transmission time computing means computes a transfer starting time of data corresponding to the reading request of each said data block based on a transfer rate of a data file including data corresponding to said reading request of each said data block registered in said transfer rate registering means, and said data transferring means transfers data fetched from said data holding means at a transfer rate of the data registered in said transfer rate registering means.

7. The data reading device as set forth in claim 1, further comprising:

data transfer rate registering means for registering a transfer rate of a data file stored in said data storing means on a basis of a data block of predetermined size formed by dividing a data file as an object of said reading request by said reading request managing means, wherein said transmission time computing means computes a transfer starting time of data corresponding to said reading request of each said data block based on a transfer rate of data corresponding to said reading request of each said data block registered in said data transfer rate registering means, and said data transferring means transfers data fetched from said data holding means at a transfer rate of the data registered in said transfer rate registering means.

8. The data reading device as set forth in claim 1, wherein said reading request issuing means designates a transfer rate of a data file as an object of said reading request and attaches the transfer rate to said reading request, said transmission time computing means computes a transfer starting time of data corresponding to a reading request of each said data block based on a transfer rate attached to said reading request, and said data transferring means transfers data fetched from said data holding means at a transfer rate attached to said reading request.

9. A data reading device for accepting an external data transfer request, reading desired data from a data storage device and transferring the data to a sender of said data transfer request, the data reading device comprising:

a reading request issuing unit that issues a reading request which designates a data file corresponding to said data transfer request;

a reading request management unit that accepts said reading request to divide an object data file into data blocks of predetermined size and designates a time of a reading deadline for each data block to generate a reading request of each data block;

a transmission time computing unit that computes a transfer starting time for each said data block which is used as a time of the reading deadline for each said data block;

a reading request sorting unit that accepts and stores a reading request of each said data block generated by said reading request management unit to fetch the requests in descending order of the reading deadlines;

a data reading unit that reads data, corresponding to a reading request at each said data block to be fetched according to said reading request sorting unit, from said data storage device;

a transmission buffer that temporarily holds data read by said data reading unit; and a data transfer unit that detects said data block whose transfer is to be started based on a transfer starting time of each said data block computed by said transmission time computing unit and fetches said detected data block from said transmission buffer to transfer said data block to a sender of said data transfer request.

10. The data reading device as set forth in claim 9, wherein said reading request issuing unit designates a read starting time for starting reading of a data file as an object of said reading request and attaches the designated time to said reading request, and said transmission time computing unit computes a transfer starting time of data corresponding to a reading request of each said data block based on a read starting time attached to said reading request.

11. The data reading device as set forth in claim 9, further comprising a transfer rate registering unit for registering a transfer rate of a data file stored in said data storage device, wherein said transmission time computing unit computes a transfer starting time of data corresponding to the reading request of each said data block based on a transfer rate of a data file including data corresponding to said reading request of each said data block registered in said transfer rate registering unit, and wherein said data transferring unit transfers data fetched from said transmission buffer at a transfer rate of the data registered in said transfer rate registering unit.

* * * * *